US012670484B2

(12) United States Patent
Hari

(10) Patent No.: US 12,670,484 B2
(45) Date of Patent: Jun. 30, 2026

(54) ARTIFICIAL INTELLIGENCE (AI)-BASED SYSTEM AND METHOD FOR PROCESSING ASSETS AND LIABILITIES WITH INTEGRATED LEGACY PLANNING

(71) Applicants: Anitha Bangalore Hari, Bengaluru (IN); Bharath Bangalore Hari, Bengaluru (IN)

(72) Inventor: Bharath Bangalore Hari, Bengaluru (IN)

(73) Assignees: Bharath Hari, Bengaluru (IN); Anitha Hari, Bengaluru (IN)

( * ) Notice: Subject to any disclaimer, the term of this patent is extended or adjusted under 35 U.S.C. 154(b) by 0 days.

(21) Appl. No.: 19/399,794

(22) Filed: Nov. 25, 2025

(65) Prior Publication Data

US 2026/0148209 A1 May 28, 2026

(51) Int. Cl.
*G06Q 20/10* (2012.01)
*G06F 21/32* (2013.01)
(Continued)

(52) U.S. Cl.
CPC ............. *G06Q 20/10* (2013.01); *G06F 21/32* (2013.01); *G06F 40/295* (2020.01); *G06F 40/30* (2020.01);
(Continued)

(58) Field of Classification Search
CPC .. G06F 40/30; G06Q 40/0631; G06Q 40/064; G06Q 2220/00; G06V 30/10
(Continued)

(56) References Cited

U.S. PATENT DOCUMENTS

| | | | |
|---|---|---|---|
| 11,972,333 B1 * | 4/2024 | Horesh | ................ G06N 3/0475 |
| 2006/0167716 A1 * | 7/2006 | Graham, Jr. | ........ G06Q 30/0601 |
| | | | 705/26.1 |

(Continued)

FOREIGN PATENT DOCUMENTS

| | | |
|---|---|---|
| EP | 3874443 A2 | 9/2021 |
| IN | 202341075311 | 11/2023 |

(Continued)

OTHER PUBLICATIONS https://www.fastercapital.com/content/Asset-Recovery--Asset-Recovery--Reclaiming-Funds-from-Dormant-Accounts.html ; Title: Asset Recovery: Asset Recovery: Reclaiming Funds from Dormant Accounts ; Publication Date: Jun. 24, 2024.

(Continued)

*Primary Examiner* — Clifford B Madamba
(74) *Attorney, Agent, or Firm* — Jason C. Cameron

(57) ABSTRACT

The present invention discloses an artificial intelligence (AI)-based system and an AI-based method for processing assets and liabilities with integrated legacy planning. The AI-based system is configured to: a) obtain personal identifiable information (PII) and biometric data, b) obtain assets data and liabilities data, c) obtain financial documents related to the assets data and the liabilities data, d) classify the obtained assets data, liabilities data, and financial documents for generating graphical insights to depict a financial performance, e) authorise users to designate defined assets and defined liabilities to beneficiaries based on the generated graphical insights, f) generate a digital will by exerting artificial intelligence (AI) models and machine learning (ML) models, g) monitor the assets data and the liabilities data for determining predefined triggering events, and h) systematise a transfer of the defined assets and the defined liabilities to the beneficiaries.

13 Claims, 8 Drawing Sheets

(51) Int. Cl.

| | |
|---|---|
| *G06F 21/40* | (2013.01) |
| *G06F 40/295* | (2020.01) |
| *G06F 40/30* | (2020.01) |
| *G06Q 40/06* | (2012.01) |
| *G06V 30/10* | (2022.01) |

(52) U.S. Cl.
CPC ....... *G06Q 40/0631* (2025.08); *G06Q 40/064* (2025.08); *G06V 30/10* (2022.01); *G06Q 2220/00* (2013.01)

(58) Field of Classification Search
USPC .......................................................... 705/39
See application file for complete search history.

(56) References Cited

U.S. PATENT DOCUMENTS

| | | | | |
|---|---|---|---|---|
| 2015/0019449 | A1* | 1/2015 | Lalwani | G06Q 10/10 705/312 |

| | | | | |
|---|---|---|---|---|
| 2018/0260924 | A1* | 9/2018 | Holt | G06Q 50/186 |
| 2021/0264520 | A1* | 8/2021 | Cummings | G06Q 40/06 |
| 2022/0028003 | A1* | 1/2022 | Evans | G06N 5/022 |
| 2022/0270174 | A1 | 8/2022 | Quaintance | |

FOREIGN PATENT DOCUMENTS

| | | |
|---|---|---|
| IN | 202442016065 | 4/2024 |
| WO | 2023070118 A1 | 4/2023 |

OTHER PUBLICATIONS https://www.wealthbrain.com/consolidation/ ; Title: WealthBrain.
https://ceur-ws.org/Vol-3702/paper21.pdf ; Title: Intelligent System for Processing and Forecasting Financial Assets and Risks ; Nickolay Rudnichenko, Vladimir Vychuzhanin, Tetiana Otradskya and Denys Shvedov ; Odessa Polytechnic National University, Shevchenko Avenue 1, Odessa, 65001, Ukraine ; Publication Date: 2024.

\* cited by examiner

200

300A

300B

300C

300D

400

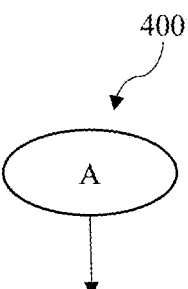

Authorise, by the one or more hardware processors through a legacy planning subsystem, the one or more users to designate defined assets of the one or more assets and defined liabilities of the one or more liabilities to the one or more beneficiaries based on the generated one or more graphical insights 410

Generate, by the one or more hardware processors through the legacy planning subsystem, a digital will by exerting at least one of: the one or more artificial intelligence (AI) models and the one or more machine learning (ML) models based on the designated defined assets and the defined liabilities to the one or more beneficiaries 412

Integrate, by the one or more hardware processors through the legacy planning subsystem, one or more smart contracts on a blockchain network to store the generated digital will 414

Monitor, by the one or more hardware processors through an event detection subsystem configured with at least one of: the one or more artificial intelligence (AI) models and the one or more machine learning (ML) models, at least one of: the assets data and the liabilities data for determining one or more predefined triggering events by web scraping at least one of: one or more national registries and obituary data 416

Systematise, by the one or more hardware processors through a legacy transfer activation subsystem, a transfer of the defined assets and the defined liabilities to the one or more beneficiaries based on validating the one or more predefined triggering events for legacy planning the one or more assets and the one or more liabilities of the one or more users to the one or more beneficiaries 418

Obtain, by one or more hardware processors through an authenticated user registration subsystem, at least one of: personal identifiable information (PII) and biometric data of at least one of: the one or more users and one or more beneficiaries 402

Obtain, by the one or more hardware processors through an asset tracking subsystem, at least one of: assets data and liabilities data, associated with the one or more assets and the one or more liabilities of the one or more users by integrating one or more application programming interfaces (APIs) with at least one of: one or more financial institutions, one or more investment firms, one or more insurance entities, and one or more global financial institutions 404

Obtain, by the one or more hardware processors through the asset tracking subsystem, one or more financial documents related to at least one of: the assets data and the liabilities data from at least one of: the one or more users, the one or more financial institutions, the one or more investment firms, the one or more insurance entities, and the one or more global financial institutions 406

Classify, by the one or more hardware processors through the asset tracking subsystem, the obtained at least one of: assets data, liabilities data, and one or more financial documents by exerting at least one of: one or more artificial intelligence (AI) models and one or more machine learning (ML) models for generating one or more graphical insights to depict a financial performance 408

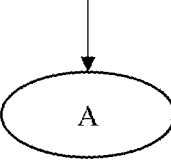

ARTIFICIAL INTELLIGENCE (AI)-BASED SYSTEM AND METHOD FOR PROCESSING ASSETS AND LIABILITIES WITH INTEGRATED LEGACY PLANNING

EARLIEST PRIORITY DATE

This Application claims priority from a Provisional patent application filed in India having Patent Application No. 202441091690, filed on 25 Nov. 2024 and titled "ARTIFICIAL INTELLIGENCE (AI)-BASED SYSTEM AND METHOD FOR PROCESSING ASSETS AND LIABILITIES WITH INTEGRATED LEGACY PLANNING".

FIELD OF INVENTION

Embodiments of the present invention relate to financial asset management systems, and more particularly relate to an artificial intelligence (AI)-based system and an AI-based method for processing one or more assets and one or more liabilities of one or more users with integrated legacy planning.

BACKGROUND

In a current era of technological advancement, managing personal finances has become increasingly complex. One or more users have multiple financial accounts, investment portfolios, retirement funds, and other one or more assets spread across one or more financial institutions. This fragmentation makes it challenging for the one or more users to maintain a comprehensive view of financial health and track all the one or more assets effectively.

Rise of online banking and digital financial services has provided more convenience, but the online banking and digital financial services have also led to a proliferation of financial accounts and platforms that the one or more users must monitor. The one or more users struggle to keep track of all financial information, leading to forgotten financial accounts, unclaimed one or more assets, and missed opportunities for optimizing financial plans.

Furthermore, the issue of the unclaimed one or more assets have become a significant concern globally. Billions of dollars in unclaimed funds are held by the one or more financial institutions and government agencies worldwide. The one or more assets remain unclaimed because one or more beneficiaries are unaware of existence of the unclaimed one or more assets, especially in cases of one of: unexpected death and when the financial accounts have been inactive for extended periods.

Traditional methods of financial management fall short of addressing these challenges. Spreadsheets and manual record-keeping may be time-consuming and prone to errors. Moreover, the spreadsheets and the manual record-keeping lack the capability to provide real-time updates and comprehensive analysis of an entire financial portfolio of the one or more users.

In an existing technology, a method to transfer the personal financial information and other hard-to-replace documents to a selected recipient post-death is disclosed. While the method aims to solve the problem of asset transfer after the death of the one or more users, the method does not provide a comprehensive solution for ongoing financial management and tracking of the unclaimed one or more assets during lifetime of the one or more users. Additionally, the method lacks advanced features for real-time financial analysis and forecasting.

Similarly in another existing technology, a system for managing the financial investments and the unclaimed one or more assets is disclosed. The system aims to provide a centralized platform for the one or more users to track the financial investments and identify the unclaimed one or more assets. The system may also provide features such as account aggregation, investment tracking, and one or more alerts for the unclaimed one or more assets. However, the system lacks sophisticated artificial intelligence capabilities for predictive analysis and personalized financial recommendations.

Despite these advancements, there remains a need for a more comprehensive and intelligent system that may seamlessly integrate the financial information from multiple sources, provide real-time insights, and assist the one or more users in managing the entire financial portfolio, including the identification and recovery of the unclaimed one or more assets. The system should be capable of adapting to an evolving financial landscape and leveraging cutting-edge technologies to provide personalised financial management solutions. There is a growing demand for solutions that not only aggregate the financial information but also provide actionable insights, automate routine tasks, and assist the one or more users in making informed decisions about financial future.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In order to overcome the above deficiencies of the prior art, the present disclosure is to solve the technical problem by providing an artificial intelligence (AI)-based system for processing one or more assets and one or more liabilities of one or more users with integrated legacy planning.

In accordance with an embodiment of the present invention, the AI-based system for processing the one or more assets and the one or more liabilities of the one or more users with integrated legacy planning is disclosed. The AI-based system comprises one or more servers. The one or more servers comprise one or more hardware processors and a memory unit. The memory unit is operatively connected to the one or more hardware processors. The memory unit comprises a set of computer-readable instructions in form of a plurality of subsystems. The plurality of subsystems is configured to be executed by the one or more hardware processors. The plurality of subsystems comprises an authenticated user registration subsystem, an asset tracking subsystem, a legacy planning subsystem, an event detection subsystem, a legacy transfer activation subsystem, a data security subsystem, and a beneficiary assistance subsystem.

In an embodiment, the authenticated user registration subsystem is configured to obtain at least one of: personal identifiable information (PII) and biometric data of at least one of: the one or more users and one or more beneficiaries. The PII comprises at least one of: name, age, contact details, postal address data, and one or more identification documents, associated with at least one of: the one or more users and the one or more beneficiaries. The biometric data comprises at least one of: fingerprint data, facial recognition data, voiceprints, iris or retinal scans, and behavioural biometrics associated with at least one of: the one or more users and the one or more beneficiaries. The authenticated user registration subsystem is configured with at least one of: one or more biometric authentication methods and multi-factor authentication (MFA) procedures to verify identity of at least one of: the one or more users and the one or more beneficiaries.

In an embodiment, the authenticated user registration subsystem is configured to exert at least one of: one or more artificial intelligence (AI) models and one or more machine learning (ML) models. At least one of: the one or more AI models and the one or more ML models comprise at least one of: one or more Optical Character Recognition (OCR) models and one or more Natural Language Processing (NLP) models, to extract information from at least one of: the personal identifiable information (PII) and the biometric data and one or more financial documents.

In an embodiment, the asset tracking subsystem is configured to: a) obtain at least one of: assets data and liabilities data, associated with the one or more assets and the one or more liabilities of the one or more users by integrating one or more application programming interfaces (APIs) with at least one of: one or more financial institutions, one or more investment firms, one or more insurance entities, and one or more global financial institutions, b) obtain the one or more financial documents related to at least one of: the assets data and the liabilities data from at least one of: the one or more users, the one or more financial institutions, the one or more investment firms, the one or more insurance entities, and the one or more global financial institutions, c) classify the obtained at least one of: the assets data, the liabilities data, and the one or more financial documents by exerting at least one of: the one or more AI models and the one or more ML models for generating one or more graphical insights to depict a financial performance.

The one or more assets and the one or more liabilities of the one or more users comprise at least one of: one or more equity components, and one or more income streams, one or more fixed assets, one or more digital assets, one or more retirement and pension accounts, one or more foreign currency holdings, loans, mortgages, credit card debt, and other financial obligations.

In an embodiment, the asset tracking subsystem integrates the one or more APIs that comprises at least one of: an OAuth 2.0 authentication application programming interfaces (APIs), Representational State Transfer ful (RESTful) application programming interfaces (APIs), Open Financial Exchange (OFX) application programming interfaces (APIs), Financial Information Exchange (FIX) protocols, Payment Services Directive 2(PSD2 ) application programming interfaces (APIs), WebSocket application programming interfaces (APIs), International Organization for Standardization (ISO) 20022 application programming interfaces (APIs), and blockchain application programming interfaces (APIs).

In an embodiment, the asset tracking subsystem is configured to exert at least one of: the one or more AI models and the one or more ML models. At least one of: the one or more AI models and the one or more ML models comprise at least one of: one or more convolutional neural networks (CNNs), a random forest, one or more gradient boosting machines (GBMs), one or more long short-term memory (LSTM) networks, one or more anomaly detection models, k-mean clustering, hierarchical clustering, Density-Based Spatial Clustering of Applications with Noise (DBSCAN) and one or more pruning techniques. The asset tracking subsystem exerting at least one of: the one or more AI models and the one or more ML models comprise the one or more Natural Language Processing (NLP) models with one or more Bidirectional Encoder Representations from Transformers (BERT) models to analyse financial broadcast for financial trends to generate one or more graphical insights and depict on a dashboard. The one or more graphical insights comprise at least one of: a portfolio diversification analysis, risk assessment reports, a performance attribution analysis, tax efficiency recommendations, personalized investment opportunities, and scenario analysis for potential market events. The one or more graphical insights are generated based on at least one of: historical data associated with at least one of: the assets data, the liabilities data, and the one or more financial documents, statistical forecasting data, and predictive analytics data, to depict the financial performance. The asset tracking subsystem is configured with at least one of: one or more data visualization models and one or more time series forecasting models, for depicting the financial performance on the dashboard to track at least one of: the assets data and the liabilities data.

In an embodiment, the legacy planning subsystem is configured to: a) authorise the one or more users to designate defined assets of the one or more assets and defined liabilities of the one or more liabilities to the one or more beneficiaries based on the generated one or more graphical insights, b) generate a digital will by exerting at least one of: the one or more AI models and the one or more ML models based on the designated defined assets and the defined liabilities to the one or more beneficiaries, and c) integrate one or more smart contracts on a blockchain network to store the generated digital will.

In an embodiment, the legacy planning subsystem is configured to suggest optimal allocation of the defined assets and the defined liabilities for legacy planning by exerting at least one of: the one or more AI models and the one or more ML models that comprise at least one of: one or more deep Q-networks, one or more policy gradient procedures, and one or more multi-agent reinforcement learning models. The legacy planning subsystem comprises a beneficiary verification module. The beneficiary verification module is configured to authenticate the one or more beneficiaries by means of at least one of: government-issued identification, social security numbers, and the biometric data.

In an embodiment, the legacy planning subsystem comprises a notification module. The notification module is configured to provide one or more alerts to the one or more beneficiaries about the designated defined assets and the defined liabilities, and the generated digital will. The legacy planning subsystem is configured to exert at least one of: the one or more AI models and the one or more ML models that comprise at least one of: the one or more NLP models, one or more generative pre-trained transformer (GPT) models, one or more named entity recognition (NER) models, one or more legal language generation models, one or more sentiment analysis models, one or more contextual embedding models, and one or more compliance check models. At least one of: the one or more AI models and the one or more ML models are configured to generate the digital will in legally compliant language.

In an embodiment, the event detection subsystem is configured with at least one of: the one or more AI models and the one or more ML models to monitor at least one of: the assets data and the liabilities data for determining one or more predefined triggering events by web scraping at least one of: one or more national registries and obituary data. The event detection subsystem is configured with at least one of: the one or more AI models and the one or more ML models that comprise at least one of: the one or more NLP models, the one or more NER models, the one or more sentiment analysis models, for web scraping. The one or more predefined triggering events comprise at least one of: account inactivity, death of the one or more users, significant health events notified by the one or more users, and abnormal metrics data detected by one or more Internet of Things (IoT) devices associated with the one or more users.

In an embodiment, the legacy transfer activation subsystem is configured to systematise a transfer of the defined assets and the defined liabilities to the one or more beneficiaries based on validating the one or more predefined triggering events for legacy planning the one or more assets and the one or more liabilities of the one or more users to the one or more beneficiaries. The legacy transfer activation subsystem is configured to obtain health metrics data through the one or more IoT devices associated with the one or more users for detecting the abnormal metrics data.

In an embodiment, the legacy transfer activation subsystem is configured with a multi-signature approval module. The multi-signature approval module is configured to validate the transfer of the defined assets and the defined liability, requiring signatures from one of: at least two trusted contacts and at least two legal representatives to confirm the one or more predefined triggering events.

In an embodiment, the data security subsystem is configured to encrypt at least one of: the PII, the biometric data, the assets data, the liabilities data, and the one or more financial documents with one or more tokenization procedures for at least one of: secure data storage, safeguarding sensitive information, averting unauthorized access, and supporting auditability and traceability. The data security subsystem is configured with one or more cryptographic proof models to authenticate the one or more beneficiaries while preserving a confidentiality of at least one of: the PII, the biometric data, the assets data, the liabilities data, and the one or more financial documents. The data security subsystem is configured with a continuous penetration testing module. The continuous penetration testing module is configured to perform a continuous testing security of the AI-based system for identifying vulnerabilities by exerting at least one of: Nessus® and Qualys®.

In an embodiment, the beneficiary assistance subsystem is configured to: a) provide guidance to the one or more beneficiaries on accessing and claiming the designated defined assets and the defined liabilities, b) recover the one or more assets and the one or more liabilities by integrating with at least one of: data mining procedures, network analysis procedures, blockchain explorers and multi-signature wallets, c) provide at least one of: a tax guidance and an inheritance guidance using one or more artificial intelligence (AI)-driven tax optimization tools and one or more compliance tools to reduce tax liabilities associated with the defined assets and the defined liabilities, and d) connect the one or more beneficiaries with one or more certified professionals for personalized assistance and support through an inheritance process of the defined assets and the defined liabilities.

In accordance with an embodiment of the present invention, an artificial intelligence AI-based method for processing the one or more assets and the one or more liabilities of the one or more users with integrated legacy planning is disclosed. At the first step, the AI-based method includes obtaining, by the one or more hardware processors through the authenticated user registration subsystem, at least one of: the PII and the biometric data of at least one of: the one or more users and the one or more beneficiaries.

At the next step, the AI-based method includes obtaining, by the one or more hardware processors through the asset tracking subsystem, at least one of: the assets data and the liabilities data, associated with the one or more assets and the one or more liabilities of the one or more users by integrating the one or more APIs with at least one of: the one or more financial institutions, the one or more investment firms, the one or more insurance entities, and the one or more global financial institutions.

At the next step, the AI-based method includes obtaining, by the one or more hardware processors through the asset tracking subsystem, the one or more financial documents related to at least one of: the assets data and the liabilities data from at least one of: the one or more users, the one or more financial institutions, the one or more investment firms, the one or more insurance entities, and the one or more global financial institutions.

At the next step, the AI-based method includes classifying, by the one or more hardware processors through the asset tracking subsystem, the obtained at least one of: assets data, liabilities data, and one or more financial documents by exerting at least one of: the one or more AI models and the one or more ML models for generating the one or more graphical insights to depict the financial performance.

At the next step, the AI-based method includes authorising, by the one or more hardware processors through the legacy planning subsystem, the one or more users to designate the defined assets and the defined liabilities to the one or more beneficiaries based on the generated one or more graphical insights.

At the next step, the AI-based method includes generating, by the one or more hardware processors through the legacy planning subsystem, the digital will by exerting at least one of: the one or more AI models and the one or more ML models based on the designated defined assets and the defined liabilities to the one or more beneficiaries.

At the next step, the AI-based method includes integrating, by the one or more hardware processors through the legacy planning subsystem, the one or more smart contracts on the blockchain network to store the generated digital will.

At the next step, the AI-based method includes monitoring, by the one or more hardware processors through the event detection subsystem configured with at least one of: the one or more AI models and the one or more ML models, at least one of: the assets data and the liabilities data for determining the one or more predefined triggering events by web scraping at least one of: the one or more national registries and the obituary data.

At the next step, the AI-based method includes systematising, by the one or more hardware processors through the legacy transfer activation subsystem, the transfer of the defined assets and the defined liabilities to the one or more beneficiaries based on validating the one or more predefined triggering events for legacy planning the one or more assets and the one or more liabilities of the one or more users to the one or more beneficiaries.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF THE DRAWINGS

The disclosure will be described and explained with additional specificity and detail with the accompanying figures in which:

FIG. 4 illustrates an exemplary flow chart depicting an artificial intelligence (AI)-based method for processing the one or more assets and the one or more liabilities of the one or more users with integrated legacy planning, in accordance with an embodiment of the present invention.

Further, those skilled in the art will appreciate that elements in the figures are illustrated for simplicity and may not have necessarily been drawn to scale. Furthermore, in terms of the method steps, chemical compounds, equipment and parameters used herein may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE PRESENT INVENTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more components, compounds, and ingredients preceded by "comprises . . . a" does not, without more constraints, preclude the existence of other components or compounds or ingredients or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present invention relate to an artificial intelligence (AI)-based system for processing one or more assets and one or more liabilities of one or more users with integrated legacy planning.

As used herein the term "legacy planning" refers to a process of structuring and arranging the one or more assets and the one or more liabilities of the one or more users to facilitate their transfer to one or more beneficiaries upon the death of the one or more users.

Figure 1:
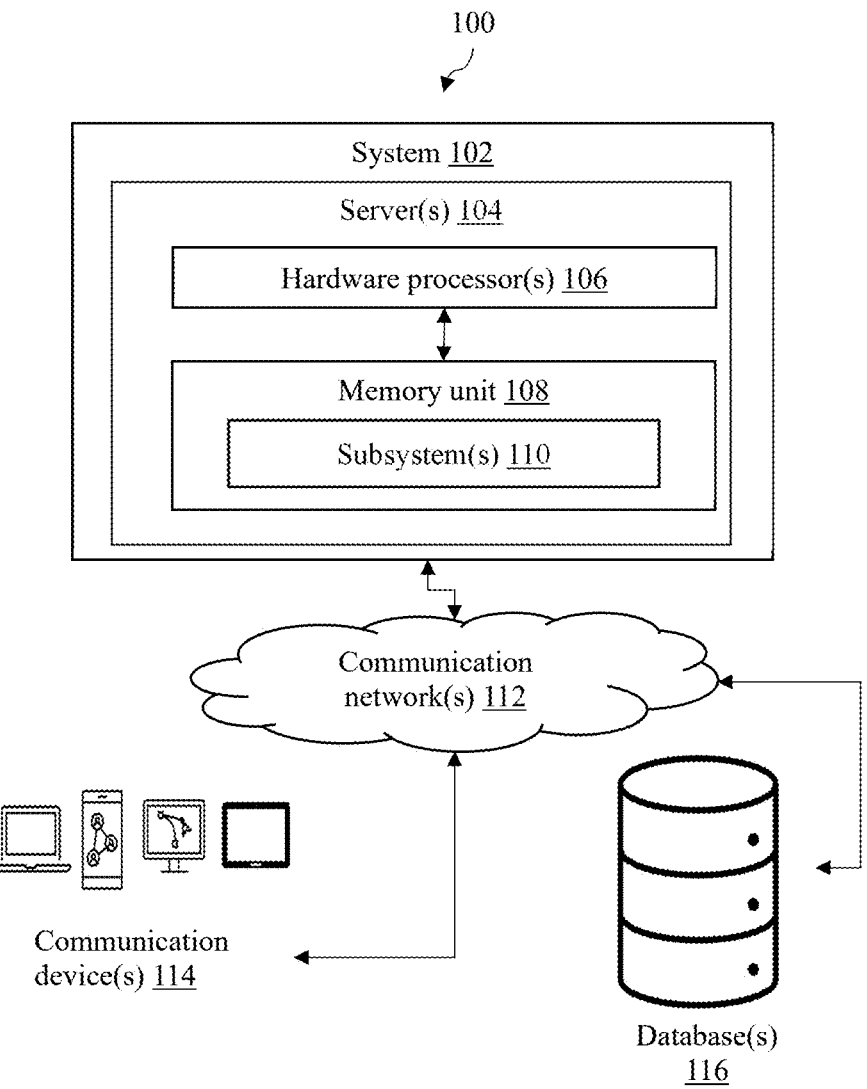
FIG. 1 illustrates an exemplary block diagram representation of a network architecture depicting an artificial intelligence (AI)-based system for processing one or more assets and one or more liabilities of one or more users with integrated legacy planning, in accordance with an embodiment of the present invention.

FIG. 1 illustrates an exemplary block diagram representation of a network architecture 100 depicting the AI-based system 102 for processing the one or more assets and the one or more liabilities of the one or more users with integrated legacy planning, in accordance with an embodiment of the present invention.

According to an exemplary embodiment of the present disclosure, the network architecture 100 may include the artificial intelligence (AI)-based system 102 (hereinafter referred to as the system 102), one or more databases 116, and one or more communication devices 114. The system 102, the one or more databases 116, and the one or more communication devices 114 may be communicatively coupled via one or more communication networks 112, ensuring seamless data transmission, processing, and decision-making. The system 102 acts as a central processing unit within the network architecture 100, responsible for processing the one or more assets and the one or more liabilities with integrated legacy planning. The system 102 is configured to execute a set of computer-readable instructions that control a plurality of subsystems 110.

In an exemplary embodiment, the system 102 comprises one or more servers 104. The one or more servers 104 may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or one or more hardware processors 106.

The one or more servers 104 comprises the one or more hardware processors 106 and a memory unit 108. The memory unit 108 is operatively connected to the one or more hardware processors 106. The memory unit 108 comprises a set of computer-readable instructions in the form of the plurality of subsystems 110, configured to be executed by the one or more hardware processors 106.

In an exemplary embodiment, the one or more hardware processors 106 may include, for example, microprocessors, microcomputers, microcontrollers, digital signal processors, central processing units, state machines, logic circuits, and/ or any devices that manipulate data or signals based on operational instructions. Among other capabilities, the one or more hardware processors 106 may fetch and execute computer-readable instructions in the memory unit 108 operationally coupled with the system 102 for performing tasks such as data processing, input/output processing, and/or any other functions. Any reference to a task in the present disclosure may refer to an operation being or that may be performed on data. The one or more hardware processors 106 are high-performance processors capable of handling large volumes of data and complex computations. The one or more hardware processors 106 may be, but not limited to, at least one of: multi-core central processing units (CPU), graphics processing units (GPUs), and specialized Artificial Intelligence (AI) accelerators that enhance an ability of the system 102 to process real-time data from one or more sources simultaneously.

In an exemplary embodiment, the one or more databases 116 may configured to store and manage data related to various aspects of the system 102. The one or more databases 116 may store at least one of, but not limited to, user information, details of the one or more beneficiaries, asset data, liability data, and the like. The one or more databases 116 serve as a centralized repository for critical data elements that are integral to the secure operation of the system 102, enabling efficient management and synchronization of one or more user profiles, the asset data, the liability data, the details of the one or more beneficiaries, and one or more pre-defined event triggers for automated decision-making and alert generation. The one or more databases 116 enable the system 102 to dynamically retrieve, analyse, and update the stored data in real-time, for providing processing the one or more assets and the one or more liabilities with integrated legacy planning. The one or more databases 116 may include different types of databases such as, but not limited to, relational databases (e.g., Structured Query Language (SQL) databases), non-Structured Query Language (NoSQL) databases (e.g., MongoDB, Cassandra), time-series databases (e.g., InfluxDB), an OpenSearch database, object storage systems (e.g., Amazon S3, PostgresDB), and the like.

In an exemplary embodiment, the one or more communication devices 114 are configured to enable at least one of: the one or more users and the one or more beneficiaries to interact with the system 102. The one or more communication devices 114 may be digital devices, computing devices, and/or networks. The one or more communication devices 114 may include, but not limited to, a mobile device, a smartphone, a personal digital assistant (PDA), a tablet computer, a phablet computer, a wearable computing device, a virtual reality/augmented reality (VR/AR) device, a laptop, a desktop, and the like.

In an exemplary embodiment, the one or more communication devices 114 may be associated with, but not limited to, one or more service providers, one or more customers, an individual, an administrator, a vendor, a technician, a specialist, an instructor, a supervisor, a team, an entity, an organization, a company, a facility, a bot, any other user, and combination thereof. The entity, the organization, and the facility may include, but not limited to, an e-commerce company, online marketplaces, service providers, retail stores, a merchant organization, a logistics company, warehouses, transportation company, an airline company, a hotel booking company, a hospital, a healthcare facility, an exercise facility, a laboratory facility, a company, an outlet, a manufacturing unit, an enterprise, an organization, an educational institution, a secured facility, a warehouse facility, a supply chain facility, any other facility/organization and the like.

In an exemplary embodiment, the one or more communication networks 112 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fibre optic network, a satellite network, a cloud computing network, a combination of networks, and the like. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth®, ZigBee, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the system 102 may be implemented by way of a single device or a combination of multiple devices that may be operatively connected or networked together. The system 102 may be implemented in hardware or a suitable combination of hardware and software.

Though few components and the plurality of subsystems 110 are disclosed in FIG. 1, there may be additional components and subsystems which is not shown, such as, but not limited to, ports, routers, repeaters, firewall devices, network devices, the one or more databases 116, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the system 102, and the one or more communication devices 114 connected to the one or more databases 116, one skilled in the art can envision that the system 102, and the one or more communication devices 114 may be connected to several user devices located at various locations and several databases via the one or more communication networks 112.

Those of ordinary skilled in the art will appreciate that the hardware depicted in FIG. 1 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

Figure 2:
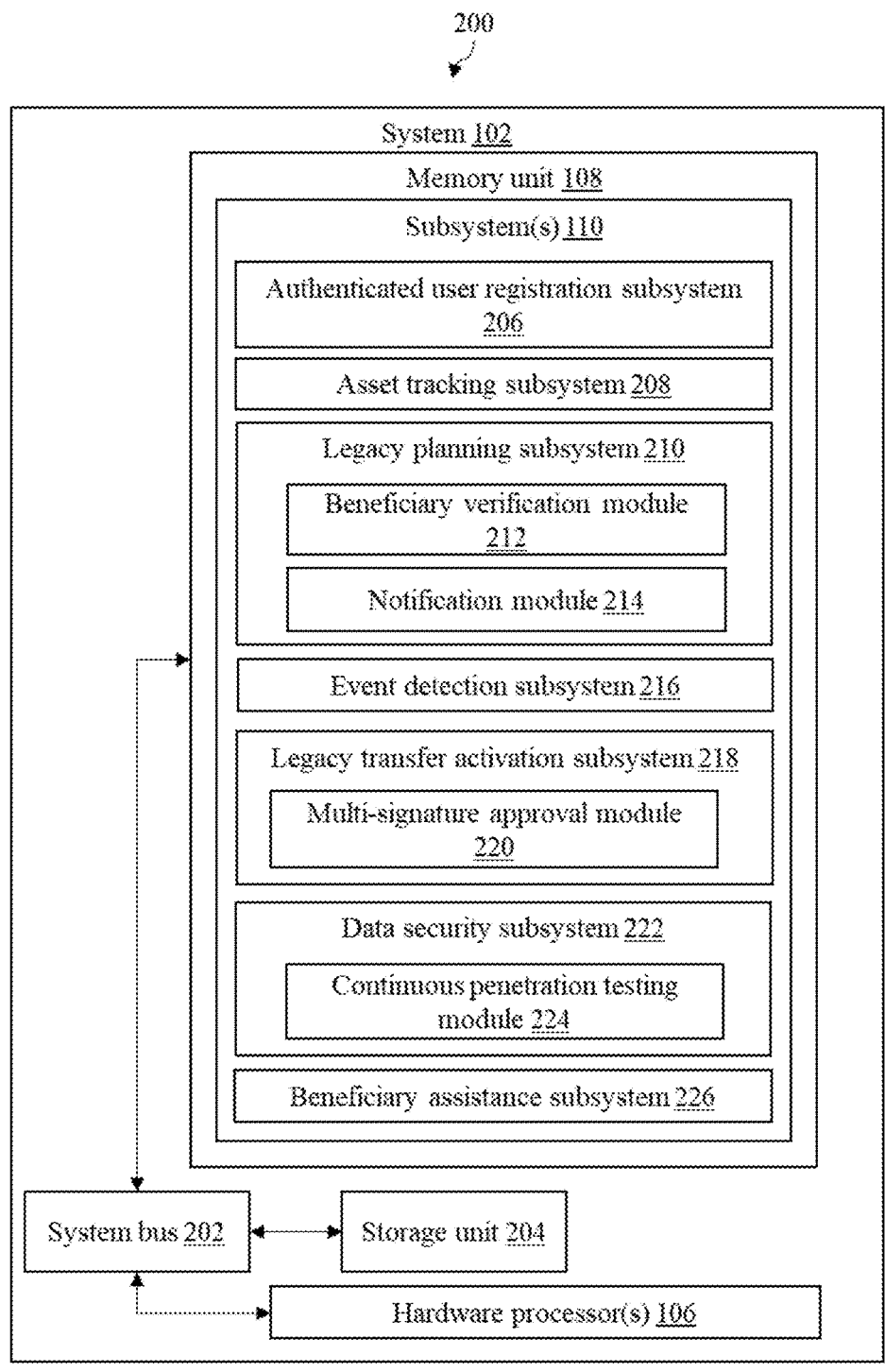
FIG. 2 illustrates an exemplary block diagram representation of the AI-based system as shown in FIG. 1 for processing the one or more assets and the one or more liabilities of the one or more users with integrated legacy planning, in accordance with an embodiment of the present disclosure.

FIG. 2 illustrates an exemplary block diagram representation 200 of the system 102 as shown in FIG. 1 for processing the one or more assets and the one or more liabilities of the one or more users with integrated legacy planning, in accordance with an embodiment of the present disclosure.

In an exemplary embodiment, the system 102 comprises the one or more servers 104, the memory unit 108, and a storage unit 204. The one or more hardware processors 106, the memory unit 108, and the storage unit 204 are communicatively coupled through a system bus 202 or any similar mechanism. The system bus 202 functions as the central conduit for data transfer and communication between the one or more hardware processors 106, the memory unit 108, and the storage unit 204. The system bus 202 facilitates the efficient exchange of information and instructions, enabling the coordinated operation of the system 102. The system bus 202 may be implemented using various technologies, including but not limited to, parallel buses, serial buses, and high-speed data transfer interfaces such as, but not limited to, at least one of a: universal serial bus (USB), peripheral component interconnect express (PCIe), and similar standards.

In an exemplary embodiment, the memory unit 108 is operatively connected to the one or more hardware processors 106. The memory unit 108 comprises the plurality of subsystems 110 in the form of programmable instructions executable by the one or more hardware processors 106. The plurality of subsystems 110 comprises an authenticated user registration subsystem 206, an asset tracking subsystem 208, a legacy planning subsystem 210, an event detection subsystem 216, a legacy transfer activation subsystem 218, a data security subsystem 222, and a beneficiary assistance subsystem 226. The one or more hardware processors 106 associated within the one or more servers 104, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 106 may also include embedded controllers, such as generic or programmable logic devices or arrays, application-specific integrated circuits, single-chip computers, and the like.

The memory unit 108 may be the non-transitory volatile memory and the non-volatile memory. The memory unit 108 may be coupled to communicate with the one or more hardware processors 106, such as being a computer-readable storage medium. The one or more hardware processors 106 may execute machine-readable instructions and/or source code stored in the memory unit 108. A variety of machine-readable instructions may be stored in and accessed from the memory unit 108. The memory unit 108 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 108 includes the plurality of subsystems 110 stored in the form of machine-readable instructions on any of the above-mentioned storage media and may be in communication with and executed by the one or more hardware processors 106.

The storage unit 204 may be a cloud storage or the one or more databases 116 such as those shown in FIG. 1. The storage unit 204 may store, but not limited to, recommended course of action sequences dynamically generated by the system 102. The action sequences comprise authenticated user registration, asset tracking, legacy planning, event detection, legacy transfer activation, data security, beneficiary assistance, and the like. Additionally, the storage unit 204 may retain previous action sequences for comparison and future reference, enabling continuous refinement of the system 102 over time. The storage unit 204 may be any kind of database such as, but not limited to, relational databases, dedicated databases, dynamic databases, monetized databases, scalable databases, cloud databases, distributed databases, any other databases, and a combination thereof.

In an exemplary embodiment, the authenticated user registration subsystem 206 is configured to securely register at least one of: the one or more users and the one or more beneficiaries. Registration is executed by obtaining at least one of: personal identifiable information (PII), biometric data, and the like of at least one of: the one or more users, the one or more beneficiaries, and the like. The PII may comprise, but not restricted to, at least one of: name, age, contact details, postal address data, one or more identification documents, and the like that is associated with at least one of: the one or more users and the one or more beneficiaries. The biometric data may comprise, but not constrained to, at least one of: fingerprint data, facial recognition data, voiceprints, iris or retinal scans, behavioural biometrics, and the like that is associated with at least one of: the one or more users and the one or more beneficiaries.

To ensure an optimal level of security, the authenticated user registration subsystem 206 is configured with at least one of: one or more biometric authentication methods, one or more multi-factor authentication (MFA) procedures, and the like to verify identities of at least one of: the one or more users and the one or more beneficiaries. At least one of: the one or more biometric authentication methods, the one or more MFA procedures, and the like may employ biometric verification processes, thereby providing an extra layer of authentication beyond standard login credentials. At least one of: the one or more biometric authentication methods, the one or more MFA procedures, and the like are configured to at least one of: a) integrate with communication device-level biometric one or more Application Programming Interfaces (APIs) for secure local authentication, b) implement Fast IDentity Online 2 (FIDO2) standards for passwordless authentication. The FIDO2 standards support the passwordless authentication by enabling at least one of: the one or more users and the one or more beneficiaries to authenticate with at least one of: biometric and cryptographic tokens instead of traditional passwords, and c) employ risk-based authentication to adjust security levels dynamically. The risk-based authentication is configured to evaluate contextual risk factors, such as location, type of the one or more communication devices 114, login behaviour, and the like to modify the security levels in real-time. For instance, if high-risk activity is detected, the authenticated user registration subsystem 206 may require additional authentication layers, such as the one or more MFA procedures. The authenticated user registration subsystem 206 effectively reduces the risk of unauthorized access, fostering a secure environment for managing sensitive data.

In an exemplary embodiment, the authenticated user registration subsystem 206 is configured to exert at least one of: one or more artificial intelligence (AI) models and one or more machine learning (ML) models. At least one of: the one or more AI models and the one or more ML models comprise at least one of: one or more Optical Character Recognition (OCR) models and one or more Natural Language Processing (NLP) models, to extract information from at least one of: the PII and the biometric data, one or more financial documents, and the like. The one or more OCR models are configured to leverage one or more convolutional neural networks (CNNs) for image preprocessing and enhancement. The one or more CNNs are configured to allow the one or more OCR models to handle at least one of: varying image qualities, document layouts, complex backgrounds, and the like of at least one of: the PII and the biometric data, the one or more financial documents, and the like. Pre-trained one or more CNN models (such as ResNet, Inception, and the like) are adapted to recognize patterns in the one or more financial documents, allowing for faster and more accurate image classification. One or more custom layers are added to refine the ability of the one or more CNN models to categorize the one or more financial documents, thereby enhancing accuracy for specific types such as invoices, statements, receipts, and the like. One or more data augmentation techniques such as, but not constrained to, at least one of: rotation, scaling, colour adjustment, and the like are applied to expand a dataset, thereby assisting the one or more CNN models in generalizing better across diverse document formats and conditions.

The one or more OCR models are configured to implement one or more recurrent neural networks (RNNs) with precision to recognize and sequence text characters within at least one of: the PII and the biometric data, the one or more financial documents, and the like, thereby enhancing accuracy in text extraction. Additionally, the one or more OCR models employ one or more transfer learning techniques. The one or more transfer learning techniques are configured to enable the one or more OCR models to adapt to various document types, thereby ensuring high performance across the diverse document formats. The one or more NLP models are configured to analyse and categorize extracted text information by the one or more OCR models to identify relevant personal information and financial information accurately.

In an exemplary embodiment, the asset tracking subsystem 208 is configured to obtain at least one of: the assets data, the liabilities data, and the like of the one or more users by integrating one or more application programming interfaces (APIs) with at least one of: one or more financial institutions, one or more investment firms, one or more insurance entities, one or more global financial institutions, and the like. At least one of: the assets data, the liabilities data, and the like are associated with the one or more assets and the one or more liabilities. The one or more APIs are configured to allow the asset tracking subsystem 208 to communicate and exchange at least one of: the assets data, the liabilities data, and the like securely and efficiently. This connectivity allows real-time access to information about financial holdings, debt obligations, and other liabilities of the one or more users.

The asset tracking subsystem 208 is configured to obtain the one or more financial documents related to at least one of: the assets data and the liabilities data from at least one of: the one or more users, the one or more financial institutions, the one or more investment firms, the one or more insurance entities, the one or more global financial institutions, and the like. Further, the asset tracking subsystem 208 is configured to classify the obtained at least one of: assets data, liabilities data, and one or more financial documents by exerting at least one of: the one or more AI models and the one or more ML models. For instance, the asset tracking subsystem 208 may differentiate between various types of financial information, such as one or more liquid assets versus one or more fixed assets, short-term one or more liabilities versus long-term one or more liabilities, and the like. At least one of: the one or more AI models and the one or more ML models are configured to process, categorize, and analyse at least one of: the assets data, the liabilities data, and the one or more financial documents, thereby enabling the asset tracking subsystem 208 to generate one or more graphical insights that visually depict a financial performance. The one or more graphical insights support the one or more users in at least one of: understanding financial trajectory, identifying areas for improvement, making informed financial decisions, and the like.

In an exemplary embodiment, the asset tracking subsystem 208 utilizes blockchain integration to track recent one or more investments and one or more payments by implementing multi-chain monitoring to support one or more cryptocurrencies. The asset tracking subsystem 208 employs one or more smart contract event listeners to track one or more decentralized finance (DeFi) investments and one or more decentralized oracles for real-time crypto value feeds, thereby ensuring accurate and up-to-date information. Additionally, the asset tracking subsystem 208 features at least one of: customizable push one or more notifications for one or more transaction alerts, Quick Response (QR) code scanning to capture one or more physical receipts, voice-activated transaction logging for hands-free entry, and the like. The asset tracking subsystem 208 is configured to: a) automate multi-account reconciliation to streamline financial management, b) leverage AI-driven payment forecasting for predicting future cash flow, and c) integrate with digital commerce platforms for seamless transaction tracking across online purchases.

The one or more assets and the one or more liabilities of the one or more users may comprise, but not limited to, at least one of: one or more equity components, and one or more income streams, one or more fixed assets, one or more digital assets, one or more retirement and pension accounts, one or more foreign currency holdings, loans, mortgages, credit card debt, other financial obligations, and the like.

The asset tracking subsystem 208 integrates the one or more APIs that may comprise, but not restricted to, at least one of: an OAuth 2.0 authentication application programming interfaces (APIs), Representational State Transfer ful (RESTful) application programming interfaces (APIs), Open Financial Exchange (OFX) application programming interfaces (APIs), Financial Information Exchange (FIX) protocols, Payment Services Directive 2(PSD2 ) application programming interfaces (APIs), WebSocket application programming interfaces (APIs), International Organization for Standardization (ISO) 20022 application programming interfaces (APIs), blockchain application programming interfaces (APIs), and the like.

The asset tracking subsystem 208 is configured with one or more webhook subscriptions for real-time updates on financial account status changes from at least one of: the one or more financial institutions, the one or more investment firms, the one or more insurance entities, the one or more global financial institutions, and the like, thereby enabling real-time monitoring and timely responses to financial account activity. The asset tracking subsystem 208 employs rate limiting and one or more caching approaches to optimize API usage. To enhance performance and reduce a load on both the one or more APIs and one or more servers associated with at least one of: the one or more financial institutions, the one or more investment firms, the one or more insurance entities, the one or more global financial institutions, and the like, rate limiting is implemented to control a number of requests made over time. The one or more caching approaches are used to store frequently accessed data temporarily, minimizing redundant one or more API calls and improving response times.

The asset tracking subsystem 208 is configured to exert at least one of: the one or more AI models and the one or more ML models. At least one of: the one or more AI models and the one or more ML models may comprise, but not constrained to, at least one of: the one or more CNNs, a random forest, one or more gradient boosting machines (GBMs), one or more long short-term memory (LSTM) networks, one or more anomaly detection models, k-mean clustering, hierarchical clustering, Density-Based Spatial Clustering of Applications with Noise (DBSCAN), one or more pruning techniques, and the like.

The random forest employs a plurality of decision trees working together as an ensemble, averaging outputs of the plurality of decision trees to improve prediction accuracy and robustness across financial datasets. The financial datasets may comprise, but not restricted to, at least one of: the one or more assets, the one or more liabilities, the one or more transactions, the one or more income streams, the one or more payments, the one or more investments, and other monetary elements. The random forest identifies and ranks features based on impact on predictions, providing insights into the most influential factors in asset and liability classification and aiding interpretability. By training each decision of the plurality of decision trees on a random subset of the financial datasets, the random forest implements bootstrap aggregating (bagging) that minimizes overfitting, ensuring that the random forest generalizes well to new, unseen financial datasets.

The one or more GBMs leverage optimized libraries such as, but not limited to, at least one of: XGBoost, LightGBM, and the like which are highly efficient and scalable, making the one or more GBMs well-suited for processing large financial datasets quickly. The one or more pruning techniques and one or more early stopping techniques monitor the performance of the one or more GBMs during training and ending, thereby enhancing generalization on the financial dataset. The one or more GBMs implement one or more feature interaction constraints to capture complex financial relationships. The one or more feature interaction constraints guide the one or more GBMs to explore meaningful interactions between variables, thereby enabling the one or more GBMs to capture intricate relationships present in the financial dataset, leading to more insightful predictions.

The one or more anomaly detection models are configured to identify unusual inactivity in the financial datasets, such as unexpected transactions, inconsistencies in the financial datasets, and the like. The one or more LSTM networks implement bidirectional one or more LSTMs that process the financial dataset sequences in both forward directions and backward directions, allowing the one or more LSTM networks to capture context from entire time series, enhancing the accuracy of financial trend predictions. One or more attention mechanisms are integrated to prioritize important points in the financial datasets, enabling the one or more LSTM networks to identify and emphasize key patterns in financial trends. The one or more LSTM networks are configured with one or more sequence-to-sequence models to analyse time-dependent financial datasets and generate detailed forecasts, which is valuable for applications such as, but not limited to, at least one of: revenue prediction, risk assessment, investment planning, and the like.

The asset tracking subsystem 208 exerts at least one of: the one or more AI models and the one or more ML models. At least one of: the one or more AI models and the one or more ML models comprise the one or more NLP models with one or more Bidirectional Encoder Representations from Transformers (BERT) models to analyse the financial datasets for the financial trends to generate the one or more graphical insights and depict the one or more graphical insights on a dashboard. The dashboard is presented on a user interface associated with the one or more communication devices 114. The one or more NLP models with the one or more BERT models are configured to analyse the financial trends such as, but not limited to, at least one of: news articles, market reports, social media feeds, and the like by extracting meaningful patterns from the financial datasets that may impact the financial performance. The one or more BERT models are specialized for finance-related language, enabling precise analysis and interpretation of the financial trends. Once the asset tracking subsystem 208 identifies the financial trends, then the asset tracking subsystem 208 generates the one or more graphical insights.

The one or more graphical insights may comprise, but not constrained to, at least one of: a portfolio diversification analysis, risk assessment reports, a performance attribution analysis, tax efficiency recommendations, personalized investment opportunities, scenario analysis for potential market events, and the like. The portfolio diversification analysis evaluates how the one or more investments are spread across different asset classes to mitigate risk. The risk assessment reports provide the one or more users with an understanding of a potential volatility of the one or more investments. The performance attribution analysis describes the factors driving investment returns. The tax efficiency recommendations optimize tax obligations related to the one or more investments of the one or more users. The personalised investment opportunities are provided based on preferences of the one or more users. The scenario analysis forecasts potential market events and possible impacts of the potential market events on the financial datasets of the one or more users.

The one or more graphical insights are generated based on at least one of: historical data associated with at least one of: the assets data, the liabilities data, and the one or more financial documents, statistical forecasting data, predictive analytics data, and the like, to depict the financial performance. By examining the historical data, the asset tracking subsystem 208 may identify key metrics and anomalies that influence current financial standing. Furthermore, the statistical forecasting data is configured to predict future outcomes based on historical trends, allowing for a more nuanced understanding of potential financial scenarios. The predictive analytics data is configured to forecast future asset performance and risk factors by analysing the variables that may impact financial markets.

The asset tracking subsystem 208 is configured with at least one of: one or more data visualization models, one or more time series forecasting models, and the like, for depicting the financial performance on the dashboard to track at least one of: the assets data and the liabilities data. The one or more data visualization models are configured to transform complex financial information into clear and comprehensible visual formats. This allows the one or more users to quickly grasp the essential financial trends, the patterns, and the anomalies in at least one of: the asset data and liability data, thereby facilitating informed decision-making. The one or more time series forecasting models are configured to predict future financial performance by analy-sing the historical data over specific time intervals. The one or more time series forecasting models are configured to identify the financial trends and seasonal variations, enabling the one or more users to anticipate potential changes in at least one of: the asset data and the liabilities data.

The asset tracking subsystem 208 is configured with a Monte Carlo Tree Search. The Monte Carlo Tree Search aids in evaluating future outcomes by simulating various finan-cial scenarios, thereby supporting strategic long-term plan-ning by assessing potential risks and returns over extended time horizons.

The dashboard displays at least one of: the assets data and the liabilities data through the one or more graphical insights that may include interactive visualizations, responsive charts, and the like, to ensure a clear understanding of the financial obligations. The one or more graphical insights employ data-driven documents (D3.js) for creating dynamic, interactive visualizations and web graphics library (WebGL) for handling the large financial datasets smoothly. The one or more graphical insights display high-level liability met-rics and provide drill-down capabilities for detailed insights. The use of Scalable Vector Graphics (SVG) ensures that the one or more graphical insights are resolution-independent. Additionally, one or more hierarchical treemaps are incor-porated to efficiently utilize space by displaying the financial information in a nested structure, where the one or more users may zoom in to explore specific categories. The one or more hierarchical treemaps incorporate colour coding to quickly identify different types of the financial information, making it easy to navigate through the complex financial information. The one or more hierarchical treemaps employ one or more squarified treemap models for efficient space utilization.

Further enhancing financial information representation, the dashboard employs Sankey diagrams, which visually map the flow of the financial information across various categories. The Sankey diagrams are configured to: a) utilize one or more force-directed graph layouts for optimal flow representation, b) implement interactive node dragging for custom arrangement, and c) employ animated transitions for displaying changes over time. The Sankey diagrams are interactive, allowing the one or more users to drag nodes for custom arrangements, and include the animated transitions to show the changes over time. One or more heatmaps are also featured with one or more calendar heatmaps displaying payment due dates and colour scales indicating urgency levels. The one or more heatmaps provide the one or more users with a quick overview of upcoming financial obliga-tions. The use of tooltips for displaying detailed financial information on hover enhances the interactivity of the dash-board, providing the one or more users with a quick and efficient way to access more granular financial information without cluttering a visual display.

To track time-based changes, one or more animated bubble charts dynamically represent the financial informa-tion. The one or more animated bubble charts employ force simulations for bubble positioning and smooth transitions to show variations over time. The one or more animated bubble charts employ size and colour encoding for multi-dimen-sional data representation. The one or more animated bubble charts implement the smooth transitions for time-based comparisons.

For a more immersive experience, the dashboard inte-grates Augmented Reality/Virtual Reality (AR/VR) capa-bilities via a web extended reality (WebXR) API, enabling cross-platform visualization in AR and VR. This allows the one or more users to interact with the financial information in a spatial environment, leveraging three dimensional (3D) rendering engines such as Three.js for visually compelling presentations. Additionally, spatial audio is used in VR environments to further enhance the financial information perception, providing a more engaging way to explore the financial information. The dashboard presents key informa-tion, including total debt amounts with a breakdown by category, a debt-to-income ratio along with a historical trend, an upcoming payment schedule, interest rates for each liability of the one or more liabilities, projected payoff dates, and a credit utilization ratio, ensuring that the one or more users have all the necessary data to make the informed financial decisions.

In an exemplary embodiment, the legacy planning sub-system 210 is configured to enable the one or more users to designate defined assets of the one or more assets and defined liabilities of the one or more liabilities to the one or more beneficiaries. By utilizing the one or more graphical insights generated from the asset tracking subsystem 208, the one or more users may make the informed decisions about how to distribute at least one of the one or more assets and the one or more liabilities to the one or more benefi-ciaries.

Furthermore, the legacy planning subsystem 210 incor-porates at least one of: the one or more AI models and the one or more ML models, to facilitate the generation of a digital will (legally binding document). Based on the des-ignated defined assets and the defined liabilities to the one or more beneficiaries, the legacy planning subsystem 210 employs at least one of: the one or more AI models and the one or more ML models to draft the digital will that reflects desires of the one or more users accurately.

The legacy planning subsystem 210 incorporates a key feature that is the AI-powered questionnaire, which uses the one or more NLP models to accurately understand and interpret inputs of the one or more users. The key feature employs the plurality of decision trees to guide the one or more users through complex legal scenarios, ensuring that a digital will creation process is intuitive, and the one or more users answer necessary one or more queries. Additionally, the one or more ML models are employed to personalize the one or more queries, ensuring that the legacy planning subsystem 210 adapts to the specific needs of the one or more users, making the digital will creation process more efficient and tailored to circumstances of the one or more users.

The legacy planning subsystem 210 is configured with a digital asset inclusion module. The digital asset inclusion module allows the one or more users to integrate the one or more cryptocurrencies and the other one or more digital assets into the digital will. The digital asset inclusion module employs the blockchain integration to securely manage the one or more digital assets and employs API connections with major digital platforms to include financial accounts from at least one of: cryptocurrency exchanges, wallets, other digital asset providers, and the like. One or more AI-driven clas-sification techniques are employed to categorize the one or more digital assets, ensuring that each type of digital asset of the one or more digital assets is properly accounted and described in the digital will.

To ensure a legal validity of the digital will across different jurisdictions, the legacy planning subsystem 210 includes several features that adapt to the specific legal requirements of various regions. A conditional clause builder employs one or more rule-based systems to construct legally sound clauses, with natural language generation making the legally sound clauses easy to understand. One or more semantic analysis models are incorporated to ensure that the legally sound clauses are coherent and legally valid. The conditional clause builder utilizes the natural language generation for creating human-readable clauses. The conditional clause builder also implements the one or more semantic analysis models to ensure clause coherence and validity.

The legacy planning subsystem 210 incorporates a version control system that uses Git-like versioning for tracking digital will revisions, ensuring that any changes made to the digital will are properly recorded. This allows the one or more users to maintain a history of all edits and easily review and revert to previous versions of the digital will. To highlight the specific modifications between different versions, one or more diff models are employed. The one or more diff models may comprise at least one of: myers, minimal, patience, and histogram. This feature enhances transparency and ensures that a final version of the digital will is the most up-to-date and accurate. Additionally, the use of blockchain ensures that the revision history is immutable, providing a secure and tamper-proof record of all changes in the digital will.

For the one or more users across the different regions, the legacy planning subsystem 210 provides a multi-language support. For the multi-language support, the legacy planning subsystem 210 employs a neural machine translation to provide accurate translations of legal terms into various languages. This ensures that the legal language remains consistent across different languages and that the one or more users may generate the digital will in the preferred language. One or more terminology management systems are employed to assist in maintaining consistent usage of legal terms. Locale-specific formatting is also employed to ensure that dates, currencies, and numbers are correctly formatted according to local standards, facilitating a smoother process for one or more international users.

To ensure that the digital will is legally valid and secure, the legacy planning subsystem 210 integrates a robust digital signature system. By using public key infrastructure (PKI), the legacy planning subsystem 210 ensures that digital signatures are secure and authentic, providing confidence in the validity of the digital will. For enhanced security, biometric verification is employed to verify the identity of the one or more users, adding an extra layer of protection against fraudulent digital signatures. The blockchain integration is employed for timestamping and verifying the authenticity of the digital signatures, thereby ensuring that the digital signatures may not be altered and forged after a fact. To further ensure the legal validity, the legacy planning subsystem 210 incorporates a jurisdiction-specific legal requirement database, an AI-driven compliance checker, and blockchain-based timestamping and notarization. These features allow the legacy planning subsystem 210 to automatically check for compliance with local laws and regulations. The jurisdiction-specific legal requirement database stores legal requirements specific to different regions, ensuring that the digital will comply with the local laws wherever the one or more users reside. The AI-driven compliance checker automatically checks the digital will against relevant legal standards to identify any compliance issues. The blockchain-based timestamping and notarization are configured to timestamp and notarize each version of the digital will, creating an immutable and tamper-proof record.

The one or more smart contracts may be used to execute the digital will based on predefined conditions provided by the one or more users. Additionally, a video recording feature is employed for virtual witnessing enabling the witnessing of the digital will remotely, which may be required in some jurisdictions. One or more local legal systems are integrated to ensure that the digital will is valid and enforceable in the relevant jurisdiction.

The digital will is then securely stored on a blockchain network through the integration of the one or more smart contracts, which ensures its immutability and accessibility. At least one of: a Hyperledger Fabric, a Quorum, and the like are incorporated to provide frameworks for building private blockchain networks where access is restricted to authorized one or more users. The blockchain network implements consensus mechanisms such as a Practical Byzantine Fault Tolerance (PBFT). The PBFT is a consensus protocol employed in permissioned blockchains to achieve agreement on a network state even when some nodes may act maliciously, ensuring reliable and consistent data across the blockchain network. The one or more smart contracts are employed for automated data access and audit logging. The legacy planning subsystem 210 employs a solidity model to create the one or more smart contracts that automatically execute predefined actions based on specific events. By integrating one or more oracles, the legacy planning subsystem 210 may access real-time external data needed to validate events, such as asset valuations, beneficiary statuses, and the like, thereby ensuring the one or more smart contracts operate on accurate and up-to-date information.

The legacy planning subsystem 210 employs one or more formal verification techniques to ensure correctness of the one or more smart contracts. The one or more formal verification techniques are configured to statistically prove the correctness of the one or more smart contracts, thereby minimizing the risk of bugs and vulnerabilities, which is crucial for maintaining trust and security in automated financial transactions.

The one or more blockchain oracles for asset verification serve as essential intermediaries that bridge the gap between the blockchain networks and external data sources, ensuring the accuracy and reliability of at least one of: the asset data and the liabilities data. Utilizing one or more decentralized oracle networks such as chain-link enables seamless data fetching from various off-chain sources, which is critical for verifying the authenticity and status of at least one of: the one or more assets, and the one or more liabilities. The implementation of one or more consensus mechanisms further enhances this process by validating data from multiple sources, thereby reducing the risk of misinformation and ensuring that only accurate data is recorded on the blockchain. Additionally, the use of cryptographic proofs guarantees data integrity across different blockchains, providing a secure and verifiable method to confirm the legitimacy of at least one of: the asset data and the liabilities data, which is vital for maintaining trust in decentralized systems.

By leveraging the blockchain network, the legacy planning subsystem 210 enhances the security and integrity of the digital will, thereby providing the one or more users with peace of mind that directives of the one or more users are executed as intended.

In an exemplary embodiment, the legacy planning subsystem 210 is configured to suggest optimal ways of allocating the defined assets and the defined liabilities for efficient legacy planning. For optimal allocation, the legacy planning subsystem 210 is configured to exert at least one of: the one or more AI models and the one or more ML models. At least one of: the one or more AI models and the one or more ML models may comprise, but not restricted to, at least one of: one or more deep Q-networks, one or more policy gradient procedures, one or more multi-agent reinforcement learning models, and the like.

The one or more deep Q-networks are configured to analyse and adjust the allocations of at least one of: the one or more assets and the one or more liabilities based on market conditions, enabling responsive, data-driven decisions that adapt dynamically to shifts in asset performance and liability performance. The one or more policy gradient procedures are employed to handle continuous and complex financial actions, allowing for more granular adjustments in investment approaches tailored to real-time market scenarios. The one or more multi-agent reinforcement learning models are configured to allow a plurality of Artificial Intelligence (AI) agents to collaboratively determine the optimal approaches for allocations of at least one of: the one or more assets and the one or more liabilities.

The legacy planning subsystem 210 is configured to provide strategic recommendations for asset distribution and liability distribution among the one or more beneficiaries. At least one of: the one or more AI models and the one or more ML models evaluate various factors, such as financial stability, risk tolerance, and tax implications, to suggest the optimal allocation that aligns with one or more legacy goals of the one or more users.

In an exemplary embodiment, the legacy planning subsystem 210 also incorporates a beneficiary verification module 212. The beneficiary verification module 212 is configured to ensure that only the designated one or more beneficiaries access the defined assets and the defined liabilities. The beneficiary verification module 212 authenticates the one or more beneficiaries by means of at least one of: government-issued identification, social security numbers, the biometric data, and the like. This level of verification enhances the security of legacy planning, thereby assisting in preventing fraud and unauthorized access.

In an exemplary embodiment, the legacy planning subsystem 210 comprises a notification module 214 that ensures the one or more beneficiaries are kept informed about the designated defined assets and defined liabilities, and the generated digital will. The notification module 214 is configured to generate one or more alerts to notify the one or more beneficiaries of any updates and key details regarding the digital will, thereby providing transparency and ensuring that the one or more beneficiaries are aware of the designated defined assets and defined liabilities and any associated responsibilities.

Additionally, the legacy planning subsystem 210 exerts at least one of: the one or more AI models and the one or more ML models to generate the digital will in a legally compliant language. At least one of: the one or more AI models and the one or more ML models may comprise, but not constrained to, at least one of: the one or more NLP models, one or more generative pre-trained transformer (GPT) models, one or more named entity recognition (NER) models, one or more legal language generation models, the one or more sentiment analysis models, one or more contextual embedding models, one or more compliance check models, and the like. The one or more NLP models and the one or more GPT models are configured to draft the digital will in precise, legally appropriate language. The one or more NER models are configured to accurately identify the one or more beneficiaries and the defined assets and the defined liabilities. The one or more NER models are configured to identify and categorize critical financial terms, such as company names, monetary values, and the like, ensuring relevant information is captured accurately. The one or more legal language generation models ensure that the digital will adheres to legal standards. The one or more sentiment analysis models and the one or more contextual embedding models are configured to craft the digital will sensitively, considering the tone and context to reflect the intentions of the one or more users accurately. The one or more compliance check models further validate the digital will to ensure that the digital will meet all relevant legal requirements, providing a robust, AI-driven approach to generating the secure digital will for effective legacy management.

In an exemplary embodiment, the event detection subsystem 216 is configured with at least one of: the one or more AI models and the one or more ML models to monitor at least one of: the assets data and the liabilities data for determining one or more predefined triggering events by web scraping at least one of: one or more national registries, obituary data, and the like. The event detection subsystem 216 performs web scraping to gather relevant data from sources such as, but not limited to, at least one of: the one or more national registries, the obituary data, and the like, thereby searching for public information that may indicate significant changes in the circumstances of the one or more users. The event detection subsystem 216 utilizes secure API connections with one or more government databases. The event detection subsystem 216 implements real-time data synchronization with at least one of: the one or more national registries, the obituary data, and the like for immediate updates. Also, the event detection subsystem 216 employs digital signature verification to ensure the authenticity and integrity of received data by web scraping.

For instance, by scanning the obituary data, the event detection subsystem 216 may detect the death of the one or more users, which may necessitate activating certain legacy plans. At least one of: the one or more AI models and the one or more ML models may comprise, but not restricted to, at least one of: the one or more NLP models, the one or more NER models, the one or more sentiment analysis models, and the like for web scraping. The event detection subsystem 216 uses the one or more NLP models to interpret textual data, such as registry entries, public announcements, and the like with the one or more NER models to specifically identify and verify specific event types and match scraped data with the one or more user profiles. The one or more sentiment analysis models further interpret nuanced information, especially in text from sources that may provide indirect indicators of significant life events. By analysing sentiment in financial news, the one or more sentiment analysis models assess one of: positive trends and negative trends.

The event detection subsystem 216 is also configured to recognize the one or more predefined triggering events, each serving as a potential indicator of a changed status of the one or more users and needs in legacy planning. The one or more predefined triggering events may comprise, but not limited to, at least one of: account inactivity, death of the one or more users, significant health events notified by the one or more users, abnormal metrics data detected by one or more Internet of Things (IoT) devices associated with the one or more users, and the like. The account inactivity may suggest disengagement of the one or more users with the system 102. The account inactivity may be monitored by at least one of: the one or more anomaly detection models that identify unusual inactivity, one or more time series analysis models that establish normal usage patterns, the one or more ML models that predict potential account dormancy, and the like.

The confirmed death of the one or more users may require immediate at least one of: asset allocation and liability allocation. Significant health events that the one or more users themselves may report, signaling potential updates to legacy arrangements. Additionally, the event detection subsystem 216 integrates with the one or more IoT devices associated with the one or more users. The one or more IoT devices may detect abnormal metrics data that may include, but not constrained to, at least one of: activity levels, health status, and the like of the one or more users. If abnormal readings are detected such as, but not limited to, at least one of: extended inactivity, irregular health metrics, other anomalous signals, and the like then the event detection subsystem 216 may interpret the abnormal readings as the one or more predefined triggering events. The one or more IoT devices may include, but not limited to, at least one of: one or more medical alert devices, one or more medical wearable devices, one or more smart home sensors, and the like.

The event detection subsystem 216 employs secure IoT protocols such as Message Queuing Telemetry Transport (MQTT) for real-time health metrics data transmission to one or more health monitoring models. The event detection subsystem 216 is configured to implement edge computing for preliminary data processing on the one or more IoT devices. The one or more health monitoring models are configured to analyse the real-time health metrics data to detect potential issues and irregularities, thereby supporting proactive legacy planning. The event detection subsystem 216 employs federated learning to improve the one or more health monitoring models while preserving privacy.

In an exemplary embodiment, the legacy transfer activation subsystem 218 is configured to systematically initiate a transfer of the defined assets and the defined liabilities to the one or more beneficiaries upon the validation of the one or more predefined triggering events. The legacy transfer activation subsystem 218 relies on the one or more predefined triggering events to ensure that a transfer process aligns with the legacy planning preferences of the one or more users, thereby seamlessly shifting the defined assets and the defined liabilities to the intended one or more beneficiaries as specified. By automating the transfer process, the legacy transfer activation subsystem 218 reduces manual intervention, providing a more reliable and efficient means of carrying out the legacy plans.

To detect the one or more predefined triggering events accurately, the legacy transfer activation subsystem 218 employs the one or more health monitoring models to actively monitor the health metrics data obtained from the one or more IoT devices. The one or more IoT devices provide the real-time health metrics data that the legacy transfer activation subsystem 218 may analyse to detect the abnormal metrics data indicating significant health changes. Such insights enable the legacy transfer activation subsystem 218 to proactively validate conditions for asset transfer and liability transfer, ensuring that the one or more beneficiaries receive the defined assets and the defined liabilities according to pre-defined conditions of the one or more users. This integration of health monitoring with the asset transfer and the liability transfer provides a comprehensive approach to managing and executing the legacy plans, thereby enhancing both security and reliability in asset distribution and liability distribution.

In an exemplary embodiment, the legacy transfer activation subsystem 218 comprises a multi-signature approval module 220 to enhance security and validation in the transfer of the defined assets and the defined liabilities. The multi-signature approval module 220 requires multiple levels of approval, meaning that the transfer may only proceed after receiving signatures from one of: at least two trusted contacts, at least two legal representatives, and the like. This approach adds a layer of verification, ensuring that the transfer is confirmed by one of: the at least two trusted contacts, the at least two legal representatives, and the like who are trusted by the one or more users and have legal oversight.

A multi-signature process is particularly important for confirming that the one or more predefined triggering events are indeed valid. One of: the at least two trusted contacts, the at least two legal representatives, and the like must review and acknowledge that the one or more predefined triggering events have occurred. This structure not only aligns with legal and regulatory requirements but also ensures that the asset transfer and the liability transfer adhere strictly to the intentions of the one or more users, with each signature adding weight to the legitimacy and accuracy of the verification of the one or more pre-defined triggering events. The multi-signature approval module 220 thereby reinforces the integrity and the reliability of legacy planning within the legacy transfer activation subsystem 218.

In an exemplary embodiment, the data security subsystem 222 is configured to encrypt the sensitive data that may include, but not limited to, at least one of: the PII, the biometric data, the assets data, the liabilities data, the one or more financial documents, and the like. Encryption is implemented through, but not constrained to, at least one of: AES-256 encryption, one or more Hardware Security Modules (HSMs), Perfect Forward Secrecy (PFS), and the like. The AES-256 encryption employs key rotation policies to periodically refresh one or more encryption keys, thereby enhancing sensitive data security by reducing exposure to potential key compromise over time. The one or more HSMs are leveraged to securely generate, store, and manage the one or more encryption keys, thereby ensuring that the encryption keys are protected from unauthorized access and tampering. The PFS ensures that each session is configured with a unique encryption key of the one or more encryption keys, so even if one encryption key of the one or more encryption keys is compromised, past communications and future communications remain secure.

The data security subsystem 222 employs one or more tokenization procedures to enhance data security, ensuring that the sensitive data is securely stored and safeguarded against the unauthorized access. The one or more tokenization procedures are configured to replace the sensitive data with unique one or more tokens, which are then stored separately from the original sensitive data, thereby reducing the risk of exposure. Tokenization with format-preserving encryption ensures that the sensitive data retains an original format. The tokenization implements a dedicated token vault that securely stores the generated one or more tokens and the mappings of the one or more tokens to the original sensitive data, with access restricted to the authorized one or more users only, further safeguarding the sensitive data. Comprehensive tokenization replaces the sensitive data across all fields, ensuring that the sensitive data is protected throughout data processing and storage.

This approach supports secure storage while also enabling auditability and traceability, so that sensitive data access and usage may be logged and reviewed as needed. By applying the one or more tokenization procedures, the data security subsystem 222 aims to prevent the unauthorized access and uphold strict sensitive data security standards.

The data security subsystem 222 also implements homomorphic encryption to ensure the privacy and security of the sensitive data. By utilizing partial homomorphic encryption for basic computations and fully homomorphic encryption for more complex operations, the data security subsystem 222 may perform calculations on encrypted sensitive data without decrypting the sensitive data. This minimizes the risk of exposing the encrypted sensitive data during processing. Moreover, the data security subsystem 222 incorporates a lattice-based cryptography to safeguard against potential quantum computing threats, making the data security subsystem 222 resistant to future quantum decryption capabilities.

To further protect user privacy, the data security subsystem 222 employs one or more differential privacy techniques. By utilizing a Laplace mechanism, the data security subsystem 222 adds noise to numerical sensitive data, ensuring that individual data points remain confidential while still allowing for useful statistical analysis. The data security subsystem 222 also applies an exponential mechanism to safeguard categorical sensitive data, which is more difficult to anonymize. Furthermore, an adaptive differential privacy is employed to dynamically adjust a privacy budget based on the amount of the sensitive data shared, ensuring that the overall privacy protection remains effective as more sensitive data is collected over time.

The federated learning is another crucial aspect of a privacy framework of the data security subsystem 222. By employing one or more secure aggregation protocols, the data security subsystem 222 ensures that privacy-preserving model updates are aggregated without exposing the individual data points, making the data security subsystem 222 ideal for training the one or more ML models without compromising user privacy. Additionally, differential privacy is integrated into the federated learning to further protect the sensitive data during training of the one or more ML models. Vertical federated learning is utilized for multiparty computations, allowing multiple organizations to collaborate on development of the one or more ML models while maintaining data privacy and security.

Secure multi-party computation (MPC) is leveraged to allow multiple parties to perform computations on the sensitive data without revealing the sensitive data itself. The data security subsystem 222 uses one or more garbled circuit protocols for Boolean circuit computations, ensuring that the Boolean circuit computations are done securely. The Boolean circuit computation employs a series of encrypted logical gates to process the sensitive data without exposing the sensitive data. Secret sharing schemes are implemented to distribute the sensitive data across multiple parties, preventing any single entity from accessing all of the sensitive data. Moreover, the data security subsystem 222 uses homomorphic secret sharing to enhance the efficiency of MPC protocols, allowing secure computations even in distributed environments. The MPC protocols allow the multiple parties to jointly compute the sensitive data. The MPC protocols employ the secret sharing schemes and the homomorphic encryption to ensure that no single entity may access all the sensitive data, enabling secure collaborative computations.

To address future threats, the data security subsystem 222 incorporates one or more quantum-resistant encryption methods. The one or more quantum-resistant encryption methods may comprise, but not limited to, at least one of: lattice-based encryption schemes, hash-based signatures, code-based cryptography, and the like. The data security subsystem 222 uses the lattice-based encryption schemes to protect the sensitive data against the decryption power of quantum computers. Additionally, the hash-based signatures are employed for post-quantum digital signatures, ensuring that the integrity and authenticity of the digital signatures remain secure in a post-quantum world. The data security subsystem 222 also integrates the code-based cryptography for key encapsulation mechanisms, thereby providing a robust method of securely sharing keys in quantum-resistant systems.

The data security subsystem 222 ensures privacy through regular third-party security audits to identify vulnerabilities and ensure compliance with industry standards. The data security subsystem 222 adheres to international standards for data protection and privacy, including a General Data Protection Regulation (GDPR). Data minimization and purpose limitation principles are embedded into the data security subsystem 222 to ensure that only the necessary sensitive data is collected and used for intended purposes. The data security subsystem 222 also implements automated data retention and deletion policies to ensure that the sensitive data is not kept longer than necessary. User-controlled data sharing preferences allow the one or more users to control what sensitive data is shared and with whom. Blockchain-based audit trails provide transparent, tamper-proof records of sensitive data access and usage, ensuring accountability and trust.

Additionally, the data security subsystem 222 incorporates one or more cryptographic proof models to authenticate the one or more beneficiaries while ensuring data confidentiality. The one or more cryptographic proof models comprise Zero-Knowledge Succinct Non-Interactive Argument of Knowledge (zk-SNARKs) that are employed to authenticate the one or more beneficiaries. The zk-SNARKs employs Pedersen commitments for verifiable secret sharing. The Pedersen commitments provide a cryptographic method for committing to a secret value without disclosing the secret value, ensuring that shared information remains private while allowing verifiable commitments. The zk-SNARKs employ interactive zero-knowledge proofs for complex verification processes. The zk-SNARKs are configured to verify the one or more beneficiaries without exposing the underlying sensitive data, thereby preserving the privacy of the sensitive data. The zero-knowledge proofs are configured to enhance data protection. Additionally, the one or more cryptographic proof models also comprise Zero-Knowledge Scalable Transparent Argument of Knowledge (zk-STARKs). The zk-STARKS are employed for post-quantum security, providing a robust mechanism for future-proofing the data security subsystem 222 against quantum attacks.

To maintain ongoing security, the data security subsystem 222 also includes a continuous penetration testing module 224. Continuous penetration testing is conducted by external security firms that provide an objective assessment of the system's 102 security posture, thereby identifying potential vulnerabilities and ensuring compliance with industry standards. The continuous penetration testing module 224 employs bug bounty programs to incentivize responsible disclosure of vulnerabilities. The bug bounty programs invite ethical hackers to identify and report security weaknesses in exchange for financial rewards, thereby fostering a collaborative security environment that enhances overall system 102 security through diverse perspectives and expertise.

The continuous penetration testing module 224 employs tools such as but not restricted to, at least one of: Nessus®, Qualys®, and the like to identify and address system 102 vulnerabilities. At least one of: the Nessus®, the Qualys®, and the like maintain an up-to-date understanding of a security landscape of the system 102 by identifying and prioritizing the vulnerabilities in real-time. The continuous penetration testing module 224 performs a continuous testing security that allows the data security subsystem 222 to stay updated with evolving security threats, regularly scanning for weaknesses and ensuring that the system 102 remains resilient against potential cyber-attacks and unauthorized access attempts.

In an exemplary embodiment, the beneficiary assistance subsystem 226 is configured to support the one or more beneficiaries through every stage of an inheritance process, from asset access and liability access to financial guidance. The beneficiary assistance subsystem 226 is configured to provide guidance to the one or more beneficiaries on how to access and claim the designated defined assets and the defined liabilities, thereby ensuring a clear understanding of the necessary steps and required documents. The beneficiary assistance subsystem 226 also includes recovery capabilities to track down and secure the one or more assets and the one or more liabilities, by integrating with at least one of: data mining procedures, network analysis procedures, blockchain explorers, multi-signature wallets, and the like. This integration ensures a comprehensive search and retrieval process across various financial platforms and systems.

The data mining procedures are configured to sift through vast amounts of the financial datasets, thereby identifying the anomalies and irregularities that suggest the existence of at least one of: one or more hidden assets and one or more hidden liabilities. The network analysis procedures are configured to map complex financial relationships. This mapping reveals the interconnectedness of various financial accounts and entities, making the network analysis procedures easier to identify patterns of behaviour and potentially fraudulent activities that may indicate at least one of: the one or more hidden assets and the one or more hidden liabilities. The one or more machine learning models are configured to analyse the historical data and identify the patterns that may suggest the concealment of the one or more assets and the one or more liabilities.

The blockchain explorers and one or more analytics tools facilitate the tracking and tracing of cryptocurrency transactions, ensuring transparency and accountability in the management of the one or more digital assets. The multi-signature wallets enhance the security of the asset transfer and the liability transfer by requiring multiple approvals, thereby reducing the risk of the unauthorized access and ensuring safe management of the one or more digital assets. Also, the beneficiary assistance subsystem 226 employs one or more digital forensics tools to efficiently access and transfer various types of the one or more digital assets, thereby allowing for thorough analysis and secure movement of the one or more digital assets while maintaining integrity and confidentiality.

The beneficiary assistance subsystem 226 incorporates one or more AI-driven legal research tools to provide real-time updates on inheritance laws, ensuring the one or more beneficiaries and one or more certified professionals have access to the most current regulations and guidelines. The beneficiary assistance subsystem 226 employs one or more document automation techniques that streamline the preparation of estate documents, reducing administrative burdens and enhancing accuracy in legal paperwork. The beneficiary assistance subsystem 226 also integrates one or more conflict resolution models that are configured to proactively identify and resolve potential inheritance disputes, facilitating smoother negotiations and preserving familial relationships.

Furthermore, the beneficiary assistance subsystem 226 is equipped with one or more artificial intelligence (AI)-driven tax optimization tools and one or more compliance tools to assist the one or more beneficiaries in managing tax obligations related to the defined assets and the defined liabilities. The AI-driven tax optimization tools and one or more compliance tools analyse applicable tax laws, exemptions, deductions, and the like thereby providing at least one of: tax guidance and inheritance guidance to reduce the financial burden associated with inheritance. The one or more beneficiaries receive tailored suggestions on how to optimize tax liabilities, maximizing the value of the inheritance. Additionally, the beneficiary assistance subsystem 226 connects the one or more beneficiaries with the one or more certified professionals for personalized assistance throughout the inheritance process. The one or more certified professionals ensures that the one or more beneficiaries receive expert support and emotional support, making the inheritance process as seamless and financially efficient as possible.

The beneficiary assistance subsystem 226 employs the VR technology to create immersive environments that facilitate grief counselling, enabling the one or more beneficiaries to process emotions in a supportive and engaging setting tailored to individual needs. The beneficiary assistance subsystem 226 also incorporates one or more chatbot systems. The one or more chatbot systems are configured to provide round-the-clock emotional support, thereby providing immediate assistance and resources to the one or more beneficiaries navigating the complexities of grief and loss at any time.

The beneficiary assistance subsystem 226 integrates one or more real-time currency exchange APIs to ensure precise asset valuation and liability valuation, thereby enabling the one or more beneficiaries to receive up-to-date financial information for informed decision-making regarding the defined assets and the defined liabilities. The beneficiary assistance subsystem 226 employs the one or more compliance tools that automate the verification of regulations and requirements for cross-border asset transfers, ensuring legal adherence and reducing the risk of regulatory issues for the one or more beneficiaries. The one or more ML models are configured to analyse and optimize tax strategies across different jurisdictions, assisting the one or more beneficiaries in minimizing the tax liabilities and maximize the financial benefits of the defined assets and the defined liabilities.

The beneficiary assistance subsystem 226 also employs the one or more data visualization models that present financial reports in an easily understandable format for the one or more beneficiaries. The beneficiary assistance subsystem 226 incorporates one or more automated reconciliation systems that ensure thorough and accurate estate accounting.

In another exemplary embodiment, the system 102 is configured to track dormant accounts and forgotten one or more assets across at least one of: the one or more financial institutions, the one or more investment firms, the one or more insurance entities, the one or more global financial institutions, and the like. The one or more unsupervised learning techniques such as clustering allows for the identification of distinct transaction patterns within the large financial datasets, which may reveal underlying trends and behaviours that may not be immediately apparent. Additionally, the one or more anomaly detection models are configured to flag unusual account inactivity, assisting in identifying potential fraud and other irregularities that may signify a breach and a need for intervention. The incorporation of the one or more multi-agent reinforcement learning models for adaptive threshold setting allows the system 102 to dynamically adjust a criteria for what constitutes "normal" behaviour, thereby improving the accuracy of dormancy detection and ensuring the timely responses to significant changes in transaction patterns. Additionally, the one or more NLP models employ one or more text classification models to categorize different types of financial statements. The one or more information extraction techniques further enhance this capability by systematically pulling relevant data from the one or more financial documents, thereby streamlining the interpretation of the financial statements and providing valuable insights for decision-making processes.

In an exemplary embodiment, automated web crawlers for unclaimed property databases are employed by the system 102. The web crawlers for the unclaimed property databases are configured to streamline the process of identifying and recovering at least one of: the one or more assets and the one or more liabilities by efficiently gathering data from various online sources. Employing a distributed crawling architecture allows for the simultaneous collection of data across multiple websites, significantly enhancing the speed and efficiency of data retrieval. To navigate one or more protected databases, one or more Completely Automated Public Turing test to tell Computers and Humans Apart (CAPTCHA) solving models are implemented. Furthermore, one or more data normalization techniques are employed to standardize the data collected across different jurisdictions, ensuring consistency and usability of the data.

The system 102 employs one or more collaborative filtering models to enhance the personalization of asset recommendations, liability recommendations, and user experiences. By utilizing one or more matrix factorization techniques, the one or more collaborative filtering models compute user-asset similarity, allowing for tailored suggestions based on the preferences of the one or more users. This method is particularly effective in identifying patterns that inform the one or more users about the one or more assets that may align with the interests of the one or more users. Furthermore, item-based collaborative filtering enables scalable recommendations by analysing relationships between different one or more assets, thereby ensuring that the one or more users receive relevant suggestions based on the interactions. The integration of one or more hybrid models that combine content-based and collaborative filtering approaches further refines this process, leveraging both user preferences and item characteristics to deliver highly personalized recommendations, ultimately improving user satisfaction and engagement in asset management.

In another exemplary embodiment, the system 102 fetch and analyse unclaimed tax refunds and payroll checks through direct API integration with at least one of: tax authorities, payroll providers, and the like. The system 102 implements secure data exchange protocols such as Secure File Transfer Protocol (SFTP) for bulk data transfers. The system 102 employs the digital signatures for data authenticity verification and data transformation layers to standardize information from different sources. The one or more NLP models employ intent classification to categorize different types of tax documents and payroll documents. The one or more NLP models implement relationship extraction to link entities within the tax documents and the payroll documents.

The one or more ML models are employed for eligibility prediction. The one or more ML models are configured to assess the likelihood of the one or more users being eligible for the unclaimed tax funds. By utilizing the one or more GBMs, the system 102 effectively navigates high-dimensional feature spaces to identify key predictors of eligibility. One or more ensemble methods are employed to combine a plurality of predictive models, thereby enhancing accuracy and robustness. One or more cross-validation techniques are employed to ensure that the one or more ML models generalize well to unseen data, minimizing the risk of overfitting and ensuring reliable predictions for eligibility assessments.

Automated form filling and submission streamlines the process of claiming the unclaimed tax refunds and the payroll checks. Robotic process automation (RPA) is used to interact with web forms, automating the input of relevant data into required fields. When necessary, natural language generation capabilities create human-like responses, enhancing the user experience and ensuring clarity in communication. The system 102 also implements error handling and retry mechanisms to provide robust and reliable form submissions, reducing the likelihood of failures in the process of claiming the unclaimed tax refunds and the payroll checks.

Blockchain-based verification system enhances the security and privacy of the claims process. By utilizing the zero-knowledge proofs, the system 102 enables privacy-preserving eligibility verification, allowing the verification of the claims without exposing the sensitive data. The one or more smart contracts automate the processing of the verified claims, ensuring that the claims are handled efficiently and transparently. One or more decentralized identifiers (DIDs) are used for secure identity management throughout the claiming process, ensuring that only the authorized one or more users may access and submit the claims while maintaining a high level of security and trust within the system 102.

In another exemplary embodiment, the system 102 tracks a comprehensive set of data points for the one or more international users. For international bank account details, the system 102 implements at least one of: International Bank Account Number (IBAN) and one or more Society for Worldwide Interbank Financial Telecommunication (SWIFT) code validation models to verify the authenticity of international bank accounts across countries, while leveraging a bank identification number (BIN) database for additional verification. The system 102 employs one or more multi-currency ledger systems for accurate tracking of international account balances in different currencies, which is essential for the one or more users managing multiple international bank accounts. Foreign investment portfolios are another focus, which utilizes the real-time one or more APIs providing stock market data for up-to-the-date portfolio valuations. For the one or more international users with property investments, the one or more ML models provide property valuations tailored to one or more real estate assets. Additionally, one or more blockchain oracles are employed to fetch decentralized and verifiable asset price feeds, thereby increasing reliability in tracking diverse one or more assets.

To handle multinational one or more retirement and pension accounts, the system 102 incorporates one or more actuarial models to project pension values accurately across various regions. The system 102 utilizes one or more tax treaty databases to optimize withdrawal approaches under different tax regimes. The system 102 implements multi-jurisdiction compliance checking for retirement account management. For tax compliance, cross-border tax obligations are managed with one or more AI-driven tax law databases, ensuring up-to-date information on requirements across jurisdictions. The system 102 is configured with one or more tax optimization models that consider the interplay of multiple tax laws. The system 102 is configured to utilize scenario modelling that assists the one or more users in making informed decisions on tax planning approaches.

Foreign currency holdings are another major area, which utilizes real-time one or more forex APIs that facilitate seamless currency conversion. The one or more time series forecasting models are configured to predict exchange rate changes. Additionally, one or more hedging strategy models are implemented to minimize currency risk in long-term investments. For visa and residency status, the one or more OCR models allow for efficient processing of visa documentation. The system 102 is configured to implement countdown timers and the one or more alerts that assist the one or more users in managing expiration dates of visa. The one or more ML models evaluate how changes in the visa and the residency status may affect financial rights of the one or more users, thereby providing a proactive approach to managing international finances.

In another exemplary embodiment, for cross-border financial management for the one or more international users, the system 102 integrates one or more country-specific financial regulation databases using the one or more NLP models to parse and analyse legal texts, enabling the system 102 to automatically extract relevant information on regulatory updates. The system 102 further employs knowledge graphs to visualize and interrelate regulatory requirements across the jurisdictions, thereby creating a clear mapping of how the regulatory requirements may impact financial operations globally. Real-time updates of the one or more country-specific financial regulation databases are managed through one or more automated update systems, ensuring that the one or more users receive current guidance on compliance requirements, regardless of the country of residence.

For real-time currency conversion, the system 102 establishes the WebSocket application programming interfaces (APIs) connections, enabling the system 102 to continuously monitor exchange rates and provide live updates to the one or more users. To handle high-frequency API requests efficiently, the one or more caching approaches are implemented, thereby reducing the load on the exchange rate APIs while still providing timely information. Additionally, the system 102 employs the one or more ML models to detect the anomalies in the exchange rates to prevent issues related to sudden currency fluctuations that may disrupt cross-border financial planning. Meanwhile, blockchain-based identity verification is facilitated through the one or more DIDs, which allow the one or more users to establish self-sovereign identities that the one or more users may use to verify the financial status securely. Verifiable credentials ensure that all proofs provided are cryptographically authenticated, while the zero-knowledge proofs are employed to maintain privacy by proving identity without exposing the sensitive data.

On the compliance side, AI-driven compliance checks leverage a combination of the one or more rule-based systems and the one or more ML models, enabling the system 102 to interpret and adapt to complex regulatory requirements. The one or more NLPs assist the system 102 in understanding and interpreting compliance requirements in the legal documents, while the plurality of decision trees guide the one or more users through complex international transfer rules. Tax calculations are managed through the one or more smart contracts that access real-time tax rate data via the one or more oracles. The one or more smart contracts are formally verified through one or more formal verification techniques to guarantee accuracy. The system 102 employs one or more gas optimization techniques to minimize execution costs for efficient contract execution. The one or more anomaly detection models are configured to identify unusual cross-border financial activities. The one or more GNNs analyse the relationships among financial entities to reveal any hidden risks. The one or more multi-agent reinforcement learning models dynamically adjust risk thresholds, allowing the system 102 to evolve with changing financial patterns. The systems create a robust framework for managing cross-border finances with transparency, efficiency, and security.

In another exemplary embodiment, the system 102 categorizes and tracks loans by leveraging a multi-layered framework that combines at least one of: the one or more NLP models, the one or more ML models, one or more neural networks, one or more user interaction techniques, and the like. For categorizing the loans into "Top" and "Unorganized" groups, the system 102 begins with the one or more NLP models for loans document analysis. The one or more NLP models allows the system 102 to process and understand various types of one or more loan documents by extracting critical information through the one or more NER models, such as loan terms, interest rates, borrower information, and the like. Using text classification, the system 102 sorts the one or more loan documents based on specific types, including personal lends, loans, credit lines, and the like. Relationship extraction links the identified loan terms with the corresponding values, ensuring each loan document of the one or more loan documents is associated with respective terms and details for accurate categorization.

The one or more ML models are configured to classify and group the one or more loan documents. By using the k-means clustering, the system 102 categorizes the one or more loan documents based on similarity across factors such as loan amount, tenure, interest rate, and the like. Hierarchical clustering then creates nested categories, grouping the one or more loan documents into subcategories for a more organized structure, such as short-term loans and high-interest loans. For detecting the one or more loan documents with unique attributes, the DBSCAN is employed, which identifies the one or more loan documents that may not fit typical patterns, assisting the system 102 in distinguishing "Unorganized" loans that may not follow standard terms or structures.

The system 102 uses the one or more neural networks for loan impact prediction to assess the potential impact of each loan on the financial health of the one or more users. The one or more RNNs associated with the one or more neural networks analyse historical loan performance over time, identifying patterns in loan repayment and default rates. The one or more attention mechanisms within the one or more RNNs allow the system 102 to focus on significant loan features, such as high-interest rates and large principal amounts. The system 102 employs the one or more transfer learning techniques to adapt the one or more RNNs to different types of loans, ensuring accurate predictions across various loan categories.

The plurality of decision trees provide another layer of loan classification. Using the random forest, the system 102 generates a robust model that classifies the loans into refined categories with a high degree of accuracy. The plurality of decision trees utilize one or more gradient boosting trees that further enhance the loan classification, thereby improving precision by adjusting weights to correct any previous loan classification errors. The one or more pruning techniques prevent the plurality of decision trees from overfitting, meaning the plurality of decision trees may generalize better across different loan types and the one or more user profiles. This classification ultimately assists in distinguishing "Top" loans, which may have favourable terms and significant relevance to the financial portfolio of the one or more users.

To monitor repayments, the system 102 applies the one or more time series analysis models. The one or more time series analysis models employs one or more autoregressive integrated moving average (ARIMA) models that handle short-term repayment forecasts, thereby tracking payment patterns over time. The one or more time series analysis models employs a prophet that is used for seasonal trends, capturing variations in repayments that may occur due to factors such as quarterly bonuses, seasonal income changes, and the like. For long-term repayment tracking, the one or more LSTM networks analyse dependencies over extended periods, enabling the system 102 to anticipate payment issues for the loans and lends, by recognizing early signs of payment inconsistencies.

One or more isolation forests assist in detecting outliers, such as the loans with unusually high interest rates and short repayment periods. The system 102 employs autoencoders that add an unsupervised layer of anomaly detection for learning loans structures and highlighting deviations. The system 102 implements one or more gaussian mixture models to identify unusual combinations of loan terms, thereby flagging high-risk or "Unorganized" loans that deviate from conventional structures.

When categorizing the loans into "Top" loans, the system 102 performs an impact score calculation. The system 102 uses one or more weighted scoring models that consider factors such as loan size, interest rate, repayment period, and the like. The system 102 implements sensitivity analysis that adjusts one or more impact scores dynamically received from one or more weighted scoring models based on changes in user financial circumstances. Additionally, the system 102 employs one or more Monte Carlo simulations that test the robustness of each impact score of the one or more impact scores under varying scenarios, ensuring that the categorization of a "Top" loan remains reliable over time. By focusing on the high-impact loans, the system 102 may highlight the loans that may significantly affect the financial health.

Correlation Analysis with the financial portfolio of the one or more users further supports the identification of "Top" loans. By calculating Pearson correlation coefficients, the system 102 measures linear relationships between financial metrics, such as income stability and loan terms. Mutual information is used to detect non-linear dependencies, providing deeper insights into complex relationships between the loans and the finances of the one or more users. For the correlation analysis, the system 102 implements canonical correlation analysis. The canonical correlation analysis enables the system 102 to examine multi-dimensional relationships, ensuring that the "Top" loans align with the financial objectives of the one or more users.

For managing "Unorganized" loans, the system 102 applies the one or more NLP models on informal agreements, thereby identifying potential loan-related terms and entities in informal communications. The one or more NLP models implements the intent classification that detects conversations and messages related to the loans. The intent classification is also employed to understand transaction purposes. The one or more NLP models implement entity extraction to identify loan principal and terms from the conversations and the messages. The one or more sentiment analysis models assist in understanding the nature of informal lending relationships, distinguishing between informal loan agreements and formal loan agreements. This allows the system 102 to track the informal loan agreements alongside the formal loan agreements. Also, the one or more sentiment analysis models are employed for contextual understanding of the financial activities.

Pattern recognition in bank transactions aids in tracking informal loans further. The system 102 employs one or more sequence mining models that analyse recurring transactions that may indicate repayments for the informal loans, such as regular transfers to specific contacts. The system 102 employs association rule learning that identifies the transactions frequently linked to potential loan activities, assisting in flagging payments that align with informal loan terms. One or more hidden Markov models track state changes in transaction patterns, providing early detection of shifts that may indicate new loans and changes in repayment activity, ensuring unorganized loans are accurately recorded.

Additionally, the user inputs enhance the tracking and categorization of "Unorganized" loans. The system 102 employs the one or more multi-agent reinforcement learning models that optimizes the timing of the user inputs, thereby prompting the one or more users at opportune moments to confirm details about the informal loan agreements. The system 102 implements natural language generation that generates contextually relevant one or more queries, making it easier for the one or more users to provide accurate information. Through one or more active learning techniques, the system 102 continually refines the understanding of the user inputs, improving the ability to categorize and track the informal loans effectively.

This comprehensive approach allows the system 102 to categorize and track the loans with high precision, distinguishing between the formal loans and the informal loans and ensuring that both "Top" and "Unorganized" loans are managed effectively, contributing to a well-rounded view of the financial landscape of the one or more users.

In another exemplary embodiment, the system 102 assesses the asset performance using a comprehensive range of financial and statistical metrics to provide an accurate, multi-faceted view of value of the one or more assets and potential. Risk-adjusted return measures are essential to evaluate performance relative to the level of risk. For instance, the system 102 uses rolling window calculations for dynamic Sharpe ratio assessments, thereby allowing continuous monitoring of risk versus return. The dynamic Sharpe ratio assessment calculates a Sharpe ratio on a continuously updated basis, capturing changes in risk and return over recent periods to reflect current investment performance. To make Treynor ratio calculations more robust, the system 102 applies one or more bootstrap methods, which resample data to improve accuracy. The Treynor ratio adjusts the returns based on market risk, with the one or more bootstrap methods ensuring stability, providing a clearer risk-adjusted measure specifically for systematic risk. Additionally, the system 102 employs one or more factor models for Jensen's alpha computation, isolating the asset's performance relative to market expectations and risk factors. The Jensen's alpha computation measures how much the asset performance exceeds market expectations, isolating unique returns by adjusting for external risk factors.

Modern portfolio theory metrics are also central, especially when managing diversified portfolios. For instance, the system 102 uses one or more covariance matrix estimation techniques for accurate beta calculation, which assists in gauging an asset sensitivity to market movements. Since high-dimensional portfolios may introduce estimation errors, one or more shrinkage methods are implemented to refine covariance calculations, ensuring better risk predictions. Non-linear dependencies between the one or more assets are captured with one or more copula models, which assists in optimizing portfolio construction under modern portfolio theory by factoring in complex correlations.

Time-weighted returns and money-weighted returns provide insights into performance over different timeframes and cash flow scenarios. One or more daily valuation methods are employed to calculate the time-weighted returns precisely, thereby making the time-weighted returns valuable for comparing performance across the one or more assets regardless of cash inflows and cash outflows. To gauge the returns based on invested capital, the system 102 uses one or more internal rate of return (IRR) models, which consider the timing of the cash flows for measuring the money-weighted returns. For long-term consistency, one or more linking methods are used to aggregate performance data, ensuring reliability in multi-period performance measurement.

The system 102 employs several advanced techniques to assess the asset performance, particularly using the one or more Monte Carlo simulations to model potential future outcomes. By leveraging one or more Geometric Brownian Motion (GBM) models, the system 102 may simulate stock price movements realistically, incorporating random variations that align with observed market behaviours. The system 102 further enhances simulation accuracy with Cholesky decomposition, which allows for the generation of correlated random variables, thereby enabling simulations to account for the relationships between the one or more assets. To improve simulation efficiency and reduce variance in results, the system 102 uses one or more variance reduction techniques such as antithetic variates. The one or more variance reduction techniques may pair opposite outcome scenarios to achieve a more reliable average, leading to faster and more stable performance assessments.

Benchmark comparison is another critical tool for evaluating the asset performance. The system 102 employs tracking error calculations to measure the degree to which the asset performance deviates from a benchmark, assisting the one or more users to understand how closely an asset of the one or more assets follows the desired benchmark. One or more style analysis techniques are employed to ensure that the benchmarks are aligned with the asset characteristics, providing more accurate comparisons. Additionally, one or more peer group construction models using one or more clustering techniques group similar one or more assets for comparative analysis, giving the one or more users a clearer picture of the asset performance in context with similar investments, which aids in making more informed decisions.

Liquidity ratios and turnover rates are monitored to assess market depth and trading activity. The system 102 uses order book data to analyse the liquidity ratios, providing insights into the supply and demand for the asset, which is crucial for the one or more assets traded in lower-volume markets. The system 102 implements volume-weighted average price (VWAP) calculations that track the turnover rates, thereby highlighting trading volumes relative to the market. For further analysis, time series decomposition is used to identify liquidity trends, assisting the one or more users in evaluating whether liquidity is increasing or decreasing over time.

For the one or more real estate assets, the system 102 evaluates performance through key metrics such as a capitalization rate and a cash-on-cash return to provide insights into profitability of the one or more real estate assets and cash flow efficiency. The system 102 utilizes one or more discounted cash flow models to project the one or more income streams based on the expected cash inflows and the cash outflows, providing an accurate estimation of future returns. To account for varying expenses, sensitivity analysis is performed, examining how changes in the expenses impact profitability. Furthermore, the one or more Monte Carlo simulations are used to estimate cash-on-cash returns under multiple scenarios, providing a robust assessment of potential outcomes. For valuation purposes, the system 102 integrates one or more automated property valuation tools, which leverage market data and the property characteristics to provide a precise, up-to-date asset valuation, aiding the one or more users in making the informed decisions based on current market conditions. The system 102 employs one or more advanced tax modelling models for tax optimization of the one or more real estate assets.

In an exemplary embodiment, the system 102 generates the one or more graphical insights on the asset portfolio by leveraging the one or more ML models that combine the random forest, the one or more GBMs, and the one or more neural networks. This approach uses one or more stacking techniques to enhance prediction accuracy for more reliable one or more graphical insights. The one or more graphical insights may comprise, but not constrained to, at least one of: the portfolio diversification analysis, the risk assessment reports, the performance attribution analysis, the tax efficiency recommendations, the personalized investment opportunities, the scenario analysis for the potential market events, and the like. Cross-validation further ensures robust model evaluation, reducing overfitting risks and providing more accurate predictions. The one or more ML models analyse portfolio data to identify at least one of: trends, risks, and opportunities, presenting the one or more users with tailored predictions on the asset performance and risk exposure based on diverse factors within the financial landscape.

To make the one or more graphical insights understandable and relevant, the system 102 incorporates the natural language generation and the one or more sentiment analysis models. The natural language generation employs both template-based and one or more neural text generation models to generate reports that vary from basic summaries to detailed narratives, enhancing user readability and relevance. The one or more multi-agent reinforcement learning models optimize the one or more graphical insights for clarity, ensuring that the one or more graphical insights align with the preferences of the one or more users and the financial goals. Additionally, the one or more sentiment analysis models with the one or more BERT models are fine-tuned on financial texts. The one or more sentiment analysis models with the one or more BERT models are configured to provide granular one or more graphical insights into market sentiment across sectors, the one or more assets, and trends, enabling the one or more users to gauge how public perception and media sentiment may impact the financial portfolios.

The one or more anomaly detection models are configured to identify unusual patterns and the outliers in the financial performance, which may indicate potential risks and hidden opportunities. The one or more isolation Forests detect the outliers and unusual transactions, allowing for efficient detection of the anomalies that may affect asset stability. The autoencoders are employed for unsupervised anomaly detection, making it easier to detect deviations. Additionally, time series decomposition assists in separating trends, seasonal patterns, and residuals in the asset data, ensuring that the system 102 may differentiate between expected fluctuations and unusual events, enhancing financial portfolio monitoring and alerting the one or more users to irregular activity.

The one or more multi-agent reinforcement learning models and the one or more time series forecasting models further refine asset management recommendations. Deep Q-Networks in the one or more multi-agent reinforcement learning models enable dynamic asset allocation, thereby adapting to market changes in real time. The one or more policy gradient procedures are configured to handle continuous action spaces, allowing for a more nuanced response to market shifts. For complex portfolio approaches, the one or more multi-agent reinforcement learning models coordinate actions across diverse one or more assets, optimizing the overall strategy. The one or more time series forecasting models such as the ARIMA and Seasonal Autoregressive Integrated Moving Average (SARIMA) provide accurate predictions in linear trends and short-term transaction forecasting. The Prophet accounts for multiple seasonality in payment patterns. The one or more LSTM networks and one or more Gated Recurrent Unit (GRU) networks capture long-term dependencies in asset behaviour. The system 102 provides the one or more users with the insights into financial portfolio changes and informs strategic adjustments to improve financial outcomes.

In an exemplary embodiment, to reduce the dormant funds and honour the intentions of the one or more users, the system 102 employs a range of innovative features and processes, combining advanced technologies with ethical decision-making frameworks. AI-driven predictive analytics plays a critical role by utilizing the one or more ML models to predict the likelihood of account dormancy. The one or more time series analysis models are leveraged to identify unusual inactivity patterns, allowing for early detection of the financial accounts at risk of being abandoned. Additionally, the one or more NLP models are used to analyse communication patterns, such as email exchanges, transaction histories, and the like to identify signals of potential dormancy. This proactive approach ensures that the intentions of the one or more users are met by preventing funds from sitting idle without proper management.

The system 102 also integrates the one or more smart contracts, using Solidity to create self-executing agreements that automatically manage financial account activities based on pre-set conditions. Real-world data is brought into the one or more smart contracts via the one or more oracles, which provide information such as market conditions, account activity, and changes in legal frameworks. For faster and more cost-effective contract execution, state channels are employed, ensuring that the transactions related to dormant accounts may be executed off-chain before being confirmed on the blockchain, enhancing efficiency while maintaining security.

To further engage the one or more users and encourage active management of the one or more assets and the one or more liabilities, the system 102 uses the one or more ML models for personalized one or more nudges. The one or more multi-agent reinforcement learning models are applied to determine the optimal timing and content of the one or more nudges, such as one or more reminders and the one or more alerts to act on the dormant funds. The natural language generation is utilized to craft personalized messages that align with the user preferences. The system 102 employs an A/B testing framework that continuously refines the effectiveness of the one or more nudges based on real-time responses, ensuring that the one or more nudges remain relevant and impactful.

The system 102 also incorporates the one or more NLP models for legacy instruction interpretation, enabling the analysis of at least one of: complex instructions, handwritten instructions, and verbally communicated instructions from the one or more users regarding the one or more assets and the one or more liabilities. Semantic parsing allows the system 102 to understand and interpret at least one of: the complex instructions, the handwritten instructions, and the verbally communicated instructions. An intent recognition assists in categorizing different types of legacy desires such as bequests, trust fund directives, and the like. Using entity linking, the system 102 connects at least one of: the complex instructions, the handwritten instructions, and the verbally communicated instructions with at least one of: specific one or more assets, the one or more liabilities, and the one or more beneficiaries, ensuring that the intentions of the one or more users are fulfilled, even if the instructions are expressed in non-standard formats.

To ensure that the intended use of funds is protected and executed correctly, the system 102 employs one or more multi-signature digital vaults. The one or more multi-signature digital vaults use threshold cryptography to distribute key management across the multiple parties, ensuring that no single entity may alter the conditions of the funds without consensus. The one or more HSMs are used to securely store cryptographic keys, adding an additional layer of protection. Furthermore, one or more time-lock puzzles are implemented for scheduling asset and liability releases, which are automatically triggered based on the fulfilment of specific conditions and dates, such as upon user request, after a certain period of dormancy, and the like.

The system 102 ensures the highest levels of security through the use of quantum encryption. By employing quantum key distribution (QKD), the system 102 ensures that the one or more communication networks 112 remain secure against quantum computing threats. Additionally, one or more post-quantum cryptography models are integrated for long-term data protection, safeguarding the sensitive data from future computational threats. The system 102 is also configured with one or more quantum random number generators that are used to produce high-quality one or more encryption keys, further strengthening the security of the one or more digital assets and ensuring that any access and changes to the financial account are executed with the utmost protection.

In an exemplary embodiment, processes designed to honour the intentions of the one or more users incorporate advanced technologies and governance frameworks. The advanced technologies and governance frameworks may comprise, but not constrained to, at least one of: a continuous authentication system, an AI ethics framework, a Decentralized autonomous organization (DAO) structure, one or more time-locked smart contracts, AR integration, one or more neuromorphic computing models, and the like. The continuous authentication system ensures ongoing verification of the identity of the one or more users, safeguarding the intentions of the one or more users against unauthorized access. The AI ethics framework guides the decision-making processes, ensuring ethical alignment with the values and the intentions of the one or more users. The use of the DAO structure empowers stakeholders to participate in the management and execution of decisions, ensuring that the system 102 remains transparent and aligned with the preferences of the one or more users. The one or more time-locked smart contracts enforce the timely release of the one or more assets and the one or more liabilities, preventing premature and delayed actions. The integration of the AR enhances user engagement, providing interactive visualizations of the financial account status, liability distribution, and asset distribution, making complex data more accessible. The one or more neuromorphic computing models mimic human-like cognitive processing, allowing for more adaptive, context-aware decisions to be made in line with the evolving needs and intentions of the one or more users. Together, the processes ensure that the system 102 remains both secure and aligned with the intentions of the one or more users in a dynamic, transparent manner.

In another exemplary embodiment, the system 102 enables both proactive communication and posthumous communication of at least one of: the one or more assets and the one or more liabilities, and legacy desires of the one or more users, ensuring that the one or more beneficiaries are well-informed as per the decisions of the one or more users. For instance, during registration, a user of the one or more users may set up the one or more alerts for the one or more beneficiaries, choosing to notify the one or more beneficiaries immediately after registration about the defined assets and the defined liabilities. Before the death of the user, if the user prefers to keep the one or more beneficiaries aware of the defined assets, the defined liabilities, and the intentions, the system 102 may transmit at least one of: scheduled one or more reminders, updates about the defined assets and the defined liabilities, any specific instructions, and the like. The one or more alerts may be adjusted by the user, so the one or more beneficiaries only receive essential, timely information that respects the desires of the one or more users for privacy and control.

In another exemplary embodiment, after the death of the user, the system 102 leverages the one or more predefined triggering events to alert the one or more beneficiaries as specified by the user. For instance, if the user had chosen to notify the one or more beneficiaries only upon the occurrence of one of: legal verification, the one or more predefined triggering events, and a death certificate upload, the system 102 may automatically initiate the one or more alerts to the one or more beneficiaries. This may include providing access to asset details and liability details, payment schedules, instructions for handling the defined liabilities and the defined assets, and the like. By using blockchain and multi-signature verification, the system 102 ensures that only verified one or more beneficiaries receive the one or more alerts, which enhances security and prevents unauthorized access.

In another example embodiment, the system 102 is configured to process at least one of: the one or more assets and the one or more liabilities of one or more expatriates. The one or more expatriates are individuals who were born in one country but work and reside in a different country due to employment or other professional reasons. The system 102 is configured handle the complexities involved in the legacy planning for the one or more expatriates with at least one of: the one or more assets and the one or more liabilities in multiple jurisdictions. Specifically, the system 102 enables the one or more expatriates to organize, manage, and plan for the transfer of their at least one of: the one or more assets and the one or more liabilities both in their homeland and in their country of residence, addressing diverse regulatory, tax, and legal requirements that may apply across borders.

In operation, the system 102 aggregates at least one of: the assets data and the liabilities data from various sources within each jurisdiction, classifies these at least one of: the one or more assets and the one or more liabilities according to local laws, and provides optimized transfer strategies that are compliant with relevant regulations in each country. Additionally, the system 102 may be tailored to address one of: dual-citizenship scenarios and cross-border inheritance laws, thus offering the one or more expatriates a cohesive solution for their legacy planning needs. The system 102 also provides guidance on potential implications of foreign ownership and tax treaties that may impact the one or more beneficiaries across different countries, thereby delivering an efficient, compliant, and transparent procedure for managing the international transfer of at least one of: the one or more assets and the one or more liabilities.

Figure 3A:
FIG. 3A illustrates an exemplary first visual representation of a user interface associated with one or more communication devices depicting an overview of one or more liabilities, in accordance with an embodiment of the present invention.
Figure 3B:
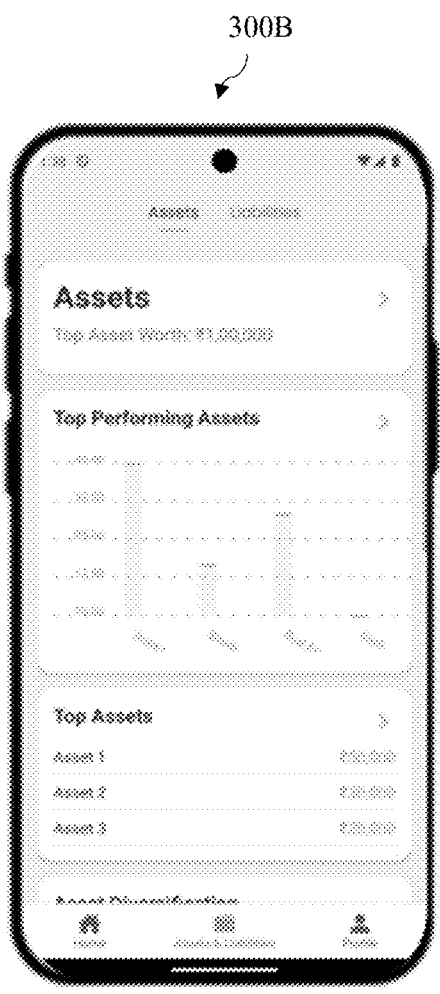
FIG. 3B illustrates an exemplary second visual representation of the user interface depicting the overview of one or more assets, in accordance with an embodiment of the present invention.
Figure 3C:
FIG. 3C illustrates an exemplary third visual representation of the user interface depicting the asset insights and transactions, in accordance with an embodiment of the present invention.
Figure 3D:
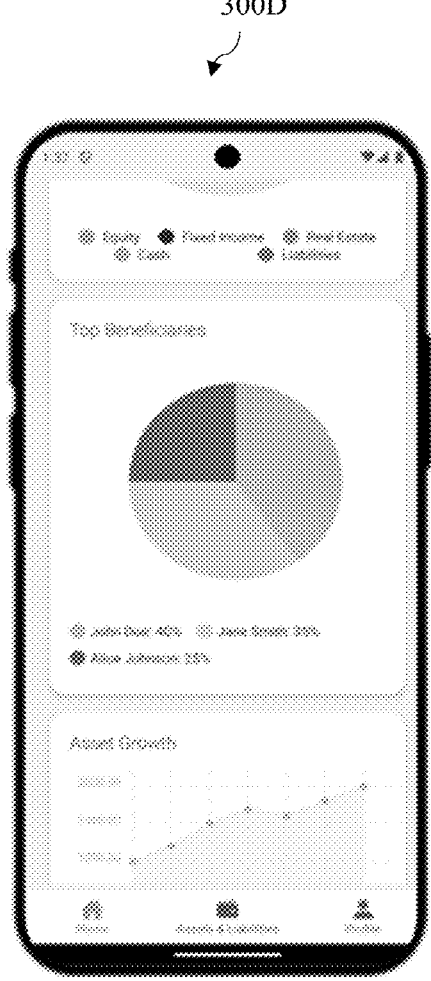
FIG. 3D illustrates an exemplary fourth visual representation of the user interface depicting one or more beneficiaries and an asset growth, in accordance with an embodiment of the present invention.

FIG. 3A illustrates an exemplary first visual representation 300A of the user interface associated with the one or more communication devices 114 depicting an overview of the one or more liabilities, in accordance with an embodiment of the present invention;

FIG. 3B illustrates an exemplary second visual representation 300B of the user interface depicting the overview of the one or more assets, in accordance with an embodiment of the present invention;

FIG. 3C illustrates an exemplary third visual representation 300C of the user interface depicting the asset insights and the transactions, in accordance with an embodiment of the present invention; and FIG. 3D illustrates an exemplary fourth visual representation 300D of the user interface depicting the one or more beneficiaries and the asset growth, in accordance with an embodiment of the present invention.

In an exemplary embodiment, as shown in FIG. 3A, the user interface provides a quick summary of total liabilities, along with a detailed liability breakdown in the form of a graphical insight (bar chart format) of the one or more graphical insights. The user interface also highlights the top loans with the loan details such as the loan amount and the interest rates, allowing the one or more users to easily track and manage outstanding financial obligations.

As shown in FIG. 3B, the user interface displays the overview of the top-performing one or more assets of the one or more users in form of the graphical insight (bar chart format) for quick assessment. The user interface provides insights into the asset performance, thereby assisting the one or more users in staying informed about which one or more assets are yielding the best returns.

As shown in FIG. 3C, the user interface displays detailed insights into asset diversification in form of the graphical insight (bar chart format) and recent transactions. The one or more users may view the distribution of the transactions across different categories, promoting better-informed financial decisions and effective financial portfolio management.

As shown in FIG. 3D, the user interface displays the graphical insight (pie chart) of the one or more beneficiaries, giving a clear view of allocation of the defined assets and the defined liabilities. Additionally, another graphical insight (line chart) shows the asset growth over time, providing the fourth visual representation 300D about how the one or more assets have one of: increased and decreased in the value.

FIG. 4 illustrates an exemplary flow chart depicting an artificial intelligence (AI)-based method 400 for processing the one or more assets and the one or more liabilities of the one or more users with integrated legacy planning, in accordance with an embodiment of the present invention.

According to an exemplary embodiment of the disclosure, the AI-based method 400 for processing the one or more assets and the one or more liabilities of the one or more users with integrated legacy planning is disclosed. At step 402, the AI-based method 400 involves using the one or more hardware processors to obtain information through the authenticated user registration subsystem. The information may comprise, but not limited to, at least one of: the PII, the biometric data, and the like of at least one of: the one or more users, the one or more beneficiaries, and the like.

At step 404, the AI-based method 400 utilizes the one or more hardware processors to acquire at least one of: the assets data and the liabilities data of the one or more users through the asset tracking subsystem. The asset tracking subsystem obtains at least one of: the assets data and the liabilities data by integrating the one or more APIs with at least one of: the one or more financial institutions, the one or more investment firms, the one or more insurance entities, the one or more global financial institutions, and the like. This integration ensures real-time, comprehensive data retrieval, enabling accurate tracking and management of the financial landscape.

At step 406, the AI-based method 400 utilizes the one or more hardware processors to acquire the one or more financial documents related to at least one of: the assets data and the liabilities data through the asset tracking subsystem. The asset tracking subsystem obtains the one or more financial documents from at least one of: the one or more users, the one or more financial institutions, the one or more investment firms, the one or more insurance entities, the one or more global financial institutions, and the like.

At step 408, the AI-based method 400 includes the one or more hardware processors for classifying the obtained at least one of: the assets data, the liabilities data, and the one or more financial documents through the asset tracking subsystem. The classification is achieved by exerting at least one of: the one or more AI models and the one or more ML models for generating the one or more graphical insights. The one or more graphical insights are configured to depict the financial performance.

At step 410, the AI-based method 400 includes the one or more hardware processors for authorising the one or more users to designate the defined assets and the defined liabilities to the one or more beneficiaries through the legacy planning subsystem. The allocation of the defined assets and the defined liabilities are based on the generated one or more graphical insights.

At step 412, the AI-based method 400 includes the one or more hardware processors for generating the digital will through the legacy planning subsystem. The digital will is generated by exerting at least one of: the one or more AI models and the one or more ML models based on the designated defined assets and the defined liabilities to the one or more beneficiaries.

At step 414, the AI-based method 400 includes the one or more hardware processors for integrating the one or more smart contracts on the blockchain network through the legacy planning subsystem. The one or more smart contracts are integrated on the blockchain network to store the generated digital will.

At step 416, the AI-based method 400 includes the one or more hardware processors for monitoring at least one of: the assets data and the liabilities data through the event detection subsystem configured with at least one of: the one or more AI models and the one or more ML models. At least one of: the assets data and the liabilities data are monitored for determining the one or more predefined triggering events. The one or more predefined triggering events are determined by web scraping at least one of: the one or more national registries and the obituary data.

At step 418, the AI-based method 400 includes the one or more hardware processors for systematising the transfer of the defined assets and the defined liabilities to the one or more beneficiaries through the legacy transfer activation subsystem. The transfer of the defined assets and the defined liabilities are implemented based on validating the one or more predefined triggering events for legacy planning the one or more assets and the one or more liabilities of the one or more users to the one or more beneficiaries.

Numerous advantages of the present disclosure may be apparent from the discussion above. In accordance with the present disclosure, the system for processing the one or more assets and the one or more liabilities of the one or more users with integrated legacy planning is disclosed. The system ensures transparency, prevents financial loss, and secures the futures of loved ones. Empowering the one or more users with the system will surely reduce the dormant funds, honour the intentions, and preserve wealth built through a lifetime of hard work and dedication. Through real-time asset tracking and liability tracking, and the one or more nudges, the system assists in preventing the dormant funds and aligns the asset distribution and the liability distribution with the intentions of the one or more users. The secure authentication, the one or more smart contracts, and the one or more multi-signature digital vaults protect the sensitive data and ensure authorized access. Additionally, the one or more graphical insights and NLP-driven legacy interpretation make it easy for the one or more users to designate the one or more assets and the one or more liabilities to the one or more beneficiaries, providing a streamlined, secure, and user-friendly approach to legacy planning, asset preservation, and liability preservation. The system provides the ability to add the one or more beneficiaries for every asset and liability and assign percentage of nomination to avoid dispute.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

What is claimed is:

1. An artificial intelligence (AI)-based system for processing one or more assets and one or more liabilities of one or more users with integrated legacy planning, comprising:

one or more servers, comprising:

one or more hardware processors; and a memory unit operatively connected to the one or more hardware processors, wherein the memory unit comprises a set of computer-readable instructions in form of a plurality of subsystems, configured to be executed by the one or more hardware processors, wherein the plurality of subsystems comprises:

an authenticated user registration subsystem configured to obtain at least one of: personal identifiable information (PII) and biometric data of at least one of: the one or more users and one or more beneficiaries, and to perform authentication using at least one of: biometric authentication and multi-factor authentication, wherein the authenticated user registration subsystem is further configured to dynamically adjust authentication requirements based on contextual risk parameters including at least one of: device information, location, and user behavior patterns;

an asset tracking subsystem configured to:

obtain at least one of: assets data and liabilities data, associated with the one or more assets and the one or more liabilities of the one or more users by integrating one or more application programming interfaces (APIs) with at least one of: one or more financial institutions, one or more investment firms, one or more insurance entities, and one or more global financial institutions;

obtain one or more financial documents related to at least one of: the assets data and the liabilities data from at least one of: the one or more users, the one or more financial institutions, the one or more investment firms, the one or more insurance entities, and the one or more global financial institutions;

monitor transaction data associated with the one or more assets across one or more blockchain networks using smart contract event listeners to detect and track asset-related events in real-time;

receive real-time updates on financial account status changes from one or more external systems using webhook subscriptions;

apply rate limiting to control a number of API requests made over time and cache frequently accessed data; and classify the obtained at least one of: assets data, liabilities data, and one or more financial documents by exerting at least one of: one or more artificial intelligence (AI) models and one or more machine learning (ML) models for generating one or more graphical insights to depict a financial performance, wherein generating the one or more graphical insights comprises constructing hierarchical data structures representing relationships among the one or more assets and the one or more liabilities, and performing space-optimized mapping of financial data elements within the hierarchical data structures;

a legacy planning subsystem configured to:

authorise the one or more users to designate defined assets of the one or more assets and defined liabilities of the one or more liabilities to the one or more beneficiaries based on the generated one or more graphical insights;

generate a digital will by exerting at least one of: the one or more artificial intelligence (AI) models and the one or more machine learning (ML) models based on the designated defined assets and defined liabilities to the one or more beneficiaries; and integrate one or more smart contracts on a blockchain network to store the generated digital will, wherein the one or more smart contracts are validated using one or more formal verification techniques;

an event detection subsystem configured with at least one of: the one or more artificial intelligence (AI) models and the one or more machine learning (ML) models to monitor at least one of: the assets data and the liabilities data for determining one or more predefined triggering events by web scraping at least one of: one or more national registries and obituary data, and by obtaining health metrics data from one or more Internet of Things (IoT) devices associated with the one or more users, wherein the one or more predefined triggering events are determined based on anomalous patterns and inactivity detected in financial and sensor data; and a legacy transfer activation subsystem configured to systematise a transfer of the defined assets and the defined liabilities to the one or more beneficiaries based on validating the one or more predefined triggering events for legacy planning the one or more assets and the one or more liabilities of the one or more users to the one or more beneficiaries.

2. The artificial intelligence (AI)-based system as claimed in claim 1, wherein the one or more assets and the one or more liabilities of one or more users comprise at least one of: one or more equity components, and one or more income streams, one or more fixed assets, one or more digital assets, one or more retirement and pension accounts, one or more foreign currency holdings, loans, mortgages, credit card debt, and other financial obligations.

3. The artificial intelligence (AI)-based system as claimed in claim 1, wherein the personal identifiable information (PII) comprises at least one of: name, age, contact details, postal address data, and one or more identification documents, associated with at least one of: the one or more users and the one or more beneficiaries; and the biometric data comprises at least one of: fingerprint data, facial recognition data, voiceprints, iris or retinal scans, and behavioural biometrics associated with at least one of: the one or more users and the one or more beneficiaries.

4. The artificial intelligence (AI)-based system as claimed in claim 1, wherein the authenticated user registration subsystem is configured to exert at least one of: the one or more artificial intelligence (AI) models and the one or more machine learning (ML) models, at least one of: the one or more artificial intelligence (AI) models and the one or more machine learning (ML) models comprise at least one of: one or more Optical Character Recognition (OCR) models and one or more Natural Language Processing (NLP) models, to extract information from at least one of: the personal identifiable information (PII) and the biometric data and the one or more financial documents.

5. The artificial intelligence (AI)-based system as claimed in claim 1, wherein the asset tracking subsystem integrates the one or more application programming interfaces (APIs) comprise at least one of: an OAuth 2.0 authentication application programming interfaces (APIs), Representational State Transfer ful (RESTful) application programming interfaces (APIs), Open Financial Exchange (OFX) application programming interfaces (APIs), Financial Information Exchange (FIX) protocols, Payment Services Directive 2 (PSD2) application programming interfaces (APIs), WebSocket application programming interfaces (APIs), International Organization for Standardization (ISO) 20022 application programming interfaces (APIs), and blockchain application programming interfaces (APIs);

the asset tracking subsystem exerting at least one of: the one or more artificial intelligence (AI) models and the one or more machine learning (ML) models comprise at least one of: one or more convolutional neural networks (CNNs), a random forest, one or more gradient boosting machines (GBMs), one or more long short-term memory (LSTM) networks, one or more anomaly detection models, k-mean clustering, hierarchical clustering, Density-Based Spatial Clustering of Applications with Noise (DBSCAN) and one or more pruning techniques;

the asset tracking subsystem exerting at least one of: the one or more artificial intelligence (AI) models and the one or more machine learning (ML) models comprise the one or more Natural Language Processing (NLP) models with one or more Bidirectional Encoder Representations from Transformers (BERT) models to analyse financial broadcast for financial trends to generate one or more graphical insights and depict on a dashboard; and the asset tracking subsystem is configured with at least one of: one or more data visualization models and one or more time series forecasting models, for depicting the financial performance on the dashboard to track at least one of: the assets data and the liabilities data.

6. The artificial intelligence (AI)-based system as claimed in claim 1, wherein the one or more graphical insights comprise at least one of: a portfolio diversification analysis, risk assessment reports, a performance attribution analysis, tax efficiency recommendations, personalized investment opportunities, and scenario analysis for potential market events; and the one or more graphical insights are generated based on at least one of: historical data associated with at least one of: the assets data, the liabilities data, and the one or more financial documents, statistical forecasting data, and predictive analytics data, to depict the financial performance.

7. The artificial intelligence (AI)-based system as claimed in claim 1, wherein the legacy planning subsystem is configured to suggest optimal allocation of the defined assets and the defined liabilities for legacy planning by exerting at least one of: the one or more artificial intelligence (AI) models and the one or more machine learning (ML) models comprise at least one of: one or more deep Q-networks, one or more policy gradient procedures, and one or more multi-agent reinforcement learning models;

the legacy planning subsystem comprises a beneficiary verification module, the beneficiary verification module is configured to authenticate the one or more beneficiaries by means of at least one of: government-issued identification, social security numbers, and the biometric data;

the legacy planning subsystem comprises a notification module configured to provide one or more alerts to the one or more beneficiaries about the designated defined assets and defined liabilities and the generated digital will; and the legacy planning subsystem is configured to exert at least one of: the one or more artificial intelligence (AI) models and the one or more machine learning (ML) models comprise at least one of: the one or more Natural Language Processing (NLP) models, one or more generative pre-trained transformer (GPT) models, one or more named entity recognition (NER) models, one or more legal language generation models, one or more sentiment analysis models, one or more contextual embedding models, and one or more compliance check models, to generate the digital will in legally compliant language.

8. The artificial intelligence (AI)-based system as claimed in claim 1, wherein the event detection subsystem configured with at least one of: the one or more artificial intelligence (AI) models and the one or more machine learning (ML) models comprises at least one of: the one or more Natural Language Processing (NLP) models, the one or more named entity recognition (NER) models, the one or more sentiment analysis models, for web scraping.

9. The artificial intelligence (AI)-based system as claimed in claim 1, wherein the one or more predefined triggering events comprises at least one of: account inactivity, death of the one or more users, significant health events notified by the one or more users, and abnormal metrics data detected by one or more Internet of Things (IoT) devices associated with the one or more users.

10. The artificial intelligence (AI)-based system as claimed in claim 1, wherein the legacy transfer activation subsystem is configured with a multi-signature approval module, the multi-signature approval module is configured to validate the transfer of the defined assets and the defined liability, requiring signatures from one of: at least two trusted contacts and at least two legal representatives to confirm the one or more predefined triggering events;

the legacy transfer activation subsystem is configured to obtain health metrics data through the one or more Internet of Things (IoT) devices associated with the one or more users for detecting the abnormal metrics data.

11. The artificial intelligence (AI)-based system as claimed in claim 1, wherein the plurality of subsystems comprises a data security subsystem, the data security subsystem configured to encrypt at least one of: the personal identifiable information (PII), the biometric data, the assets data, the liabilities data, and the one or more financial documents with one or more tokenization procedures for at least one of:

secure data storage, safeguarding sensitive information, averting unauthorized access, and supporting auditability and traceability;

the data security subsystem is configured with one or more cryptographic proof models to authenticate the one or more beneficiaries while preserving a confidentiality of at least one of: the personal identifiable information (PII), the biometric data, the assets data, the liabilities data, and the one or more financial documents; and the data security subsystem configured with a continuous penetration testing module, the continuous penetration testing module is configured to perform a continuous testing security of the artificial intelligence (AI)-based system for identifying vulnerabilities by exerting at least one of: Nessus® and Qualys®.

12. The artificial intelligence (AI)-based system as claimed in claim 1, wherein the plurality of subsystems comprises a beneficiary assistance subsystem, the beneficiary assistance subsystem is configured to: provide guidance to the one or more beneficiaries on accessing and claiming the designated defined assets and the defined liabilities;

recover the one or more assets and the one or more liabilities by integrating with at least one of: data mining procedures, network analysis procedures, blockchain explorers and multi-signature wallets;

provide at least one of: a tax guidance and an inheritance guidance using one or more artificial intelligence (AI)-driven tax optimization tools and one or more compliance tools to reduce tax liabilities associated with the defined assets and the defined liabilities; and connect the one or more beneficiaries with one or more certified professionals for personalized assistance and support through an inheritance process of the defined assets and the defined liabilities.

13. An artificial intelligence (AI)-based method for processing one or more assets and one or more liabilities of one or more users with integrated legacy planning, comprising:

obtaining, by one or more hardware processors, through an authenticated user registration subsystem, at least one of: personal identifiable information (PII) and biometric data of at least one of: the one or more users and one or more beneficiaries;

performing, by one or more hardware processors, authentication using at least one of: biometric authentication and multi-factor authentication, and dynamically adjusting authentication requirements based on contextual risk parameters including at least one of: device information, location, and user behavior patterns; obtaining, by the one or more hardware processors, through an asset tracking subsystem, at least one of: assets data and liabilities data, associated with the one or more assets and the one or more liabilities of the one or more users by integrating one or more application programming interfaces (APIs) with at least one of: one or more financial institutions, one or more investment firms, one or more insurance entities, and one or more global financial institutions;

obtaining, by the one or more hardware processors, through the asset tracking subsystem, one or more financial documents related to at least one of: the assets data and the liabilities data from at least one of: the one or more users, the one or more financial institutions, the one or more investment firms, the one or more insurance entities, and the one or more global financial institutions;

monitoring, by one or more hardware processors, transaction data associated with the one or more assets across one or more blockchain networks using smart contract event listeners to detect and track asset-related events in real-time;

receiving, by one or more hardware processors, real-time updates on financial account status changes from one or more external systems using webhook subscriptions;

applying, by one or more hardware processors, rate limiting to control a number of API requests made over time and caching frequently accessed data;

classifying, by the one or more hardware processors through the asset tracking subsystem, the obtained at least one of: assets data, liabilities data, and one or more financial documents by exerting at least one of: one or more artificial intelligence (AI) models and one or more machine learning (ML) models for generating one or more graphical insights to depict a financial performance;

generating the one or more graphical insights by constructing hierarchical data structures representing relationships among the one or more assets and the one or more liabilities, and performing space-optimized mapping of financial data elements within the hierarchical data structures;

authorising, by the one or more hardware processors through a legacy planning subsystem, the one or more users to designate defined assets of the one or more assets and defined liabilities of the one or more liabilities to the one or more beneficiaries based on the generated one or more graphical insights;

generating, by the one or more hardware processors through the legacy planning subsystem, a digital will by exerting at least one of: the one or more artificial intelligence (AI) models and the one or more machine learning (ML) models based on the designated defined assets and the defined liabilities to the one or more beneficiaries;

integrating, by the one or more hardware processors through the legacy planning subsystem, one or more smart contracts on a blockchain network to store the generated digital will, and validating the one or more smart contracts using one or more formal verification techniques;

monitoring, by the one or more hardware processors through an event detection subsystem configured with at least one of: the one or more artificial intelligence (AI) models and the one or more machine learning (ML) models, at least one of: the assets data and the liabilities data;

determining one or more predefined triggering events by web scraping at least one of: one or more national registries and obituary data, and by obtaining health metrics data from one or more Internet of Things (IoT) devices associated with the one or more users, wherein the one or more predefined triggering events are determined based on anomalous patterns and inactivity detected in financial and sensor data; and systematising, by the one or more hardware processors through a legacy transfer activation subsystem, a transfer of the defined assets and the defined liabilities to the one or more beneficiaries based on validating the one or more predefined triggering events for legacy planning the one or more assets and the one or more liabilities of the one or more users to the one or more beneficiaries.

* * * * *